(12) United States Patent
Sun et al.

(10) Patent No.: US 10,101,745 B1
(45) Date of Patent: Oct. 16, 2018

(54) ENHANCING AUTONOMOUS VEHICLE PERCEPTION WITH OFF-VEHICLE COLLECTED DATA

(71) Applicant: The Charles Stark Draper Laboratory, Inc., Cambridge, MA (US)

(72) Inventors: Fei Sun, Belmont, MA (US); Troy Jones, Somerville, MA (US); Scott Lennox, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/497,821

(22) Filed: Apr. 26, 2017

(51) Int. Cl.
| | |
|---|---|
| *G05D 1/00* | (2006.01) |
| *G01C 21/10* | (2006.01) |
| *G01C 21/20* | (2006.01) |
| *G07C 5/00* | (2006.01) |
| *G06F 17/00* | (2006.01) |
| *G01C 21/00* | (2006.01) |
| *G06F 17/30* | (2006.01) |

(Continued)

(52) U.S. Cl.
CPC ......... *G05D 1/0088* (2013.01); *G01C 21/005* (2013.01); *G01C 21/10* (2013.01); *G01C 21/20* (2013.01); *G06F 17/30477* (2013.01); *G07C 5/008* (2013.01); *G01S 19/13* (2013.01); *H04W 4/02* (2013.01)

(58) Field of Classification Search
CPC ........ G01C 21/00; G01C 21/10; G01C 21/20; G01C 21/26; G01C 21/34; G05D 1/00; G07C 5/00; G07C 5/008
See application file for complete search history.

(56) References Cited

U.S. PATENT DOCUMENTS

| | | | |
|---|---|---|---|
| 8,493,198 B1 | 7/2013 | Juan et al. | |
| 9,195,894 B2 * | 11/2015 | Vasquez | B60Q 9/008 |

(Continued)

FOREIGN PATENT DOCUMENTS

| | | |
|---|---|---|
| EP | 2731088 | 5/2014 |
| WO | 2015008290 | 1/2015 |

OTHER PUBLICATIONS

International Search Report and Written Opinion of PCT/US2017/029637 entitled "Enhancing Autonomous Vehicle Perception With Off-Vehicle Collected Data" dated Dec. 11, 2017.

*Primary Examiner* — Yonel Beaulieu
(74) *Attorney, Agent, or Firm* — Hamilton, Brook, Smith & Reynolds, P.C.

(57) ABSTRACT

In an embodiment, a method includes receiving, at an autonomous vehicle, reported data regarding an object in proximity to the autonomous vehicle. The data is collected by a collecting device external to the autonomous vehicle, and is relayed to the autonomous vehicle via a server. The reported data includes a current location, type, or predicted location of the object. The method further includes determining whether the reported data of the object matches an object in an object list determined by on-board sensors of the autonomous vehicle. If the determination finds a found object in the object list, the method correlates the reported data of the object to the found object in the object list. Otherwise, the method adds the reported data of the object to an object list of objects detected by sensor from on-board sensors of the autonomous vehicle. In embodiments, the collecting device is a mobile device.

31 Claims, 17 Drawing Sheets

(51) Int. Cl.
*G01S 19/13* (2010.01)
*H04W 4/02* (2018.01)

(56) References Cited

U.S. PATENT DOCUMENTS

| | | | |
|---|---|---|---|
| 9,428,186 B2 * | 8/2016 | Breed | B60W 30/09 |
| 9,460,616 B1 | 10/2016 | Tomohiro | |
| 2008/0009965 A1 * | 1/2008 | Bruemmer | G05D 1/0088 |
| | | | 700/245 |
| 2012/0291049 A1 * | 11/2012 | Park | G06F 9/5027 |
| | | | 719/318 |
| 2014/0055276 A1 * | 2/2014 | Logan | H04Q 9/00 |
| | | | 340/686.6 |
| 2017/0139411 A1 * | 5/2017 | Hartung | H04L 12/40 |
| 2017/0277193 A1 * | 9/2017 | Frazzoli | G05D 1/0212 |
| 2017/0277195 A1 * | 9/2017 | Frazzoli | G05D 1/0214 |
| 2018/0063458 A1 * | 3/2018 | Shida | H04N 5/374 |

* cited by examiner

Fig. 2 - Architecture

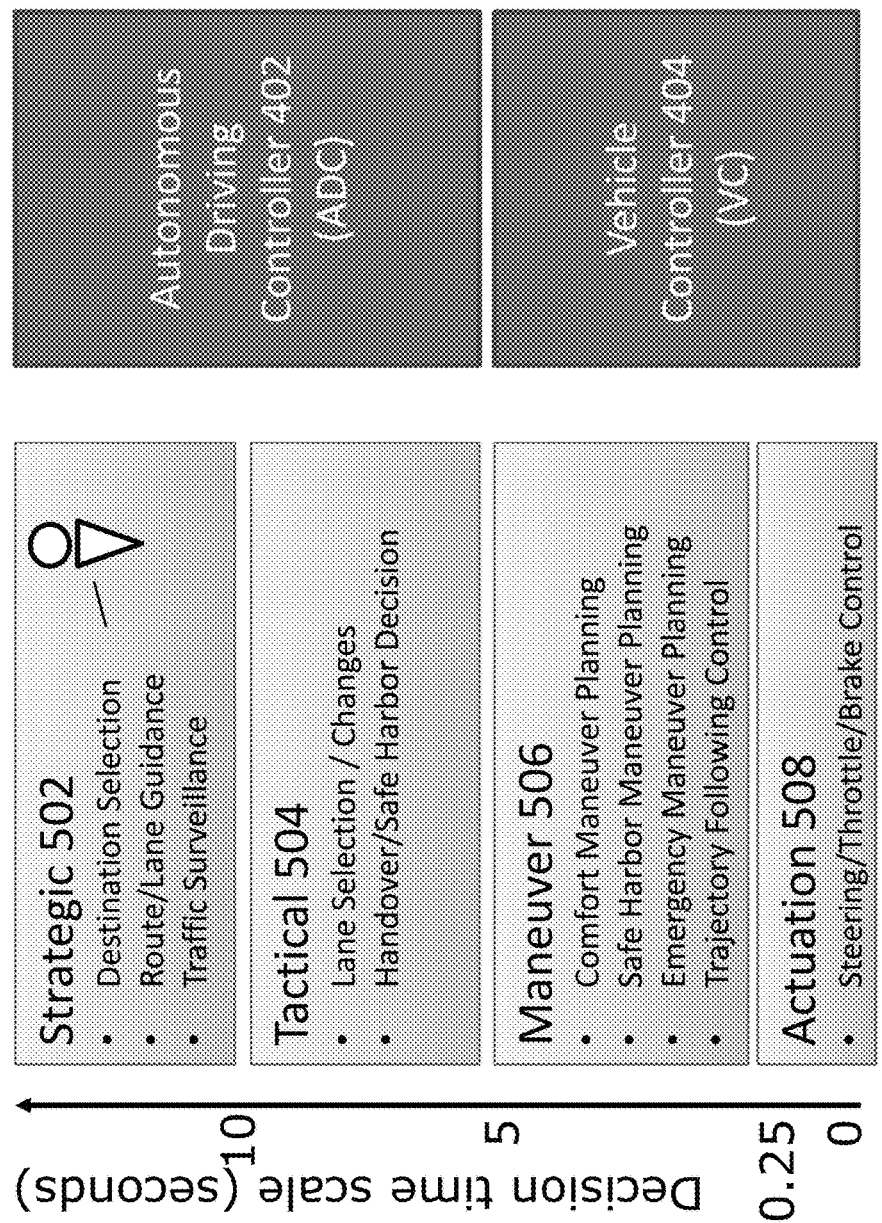

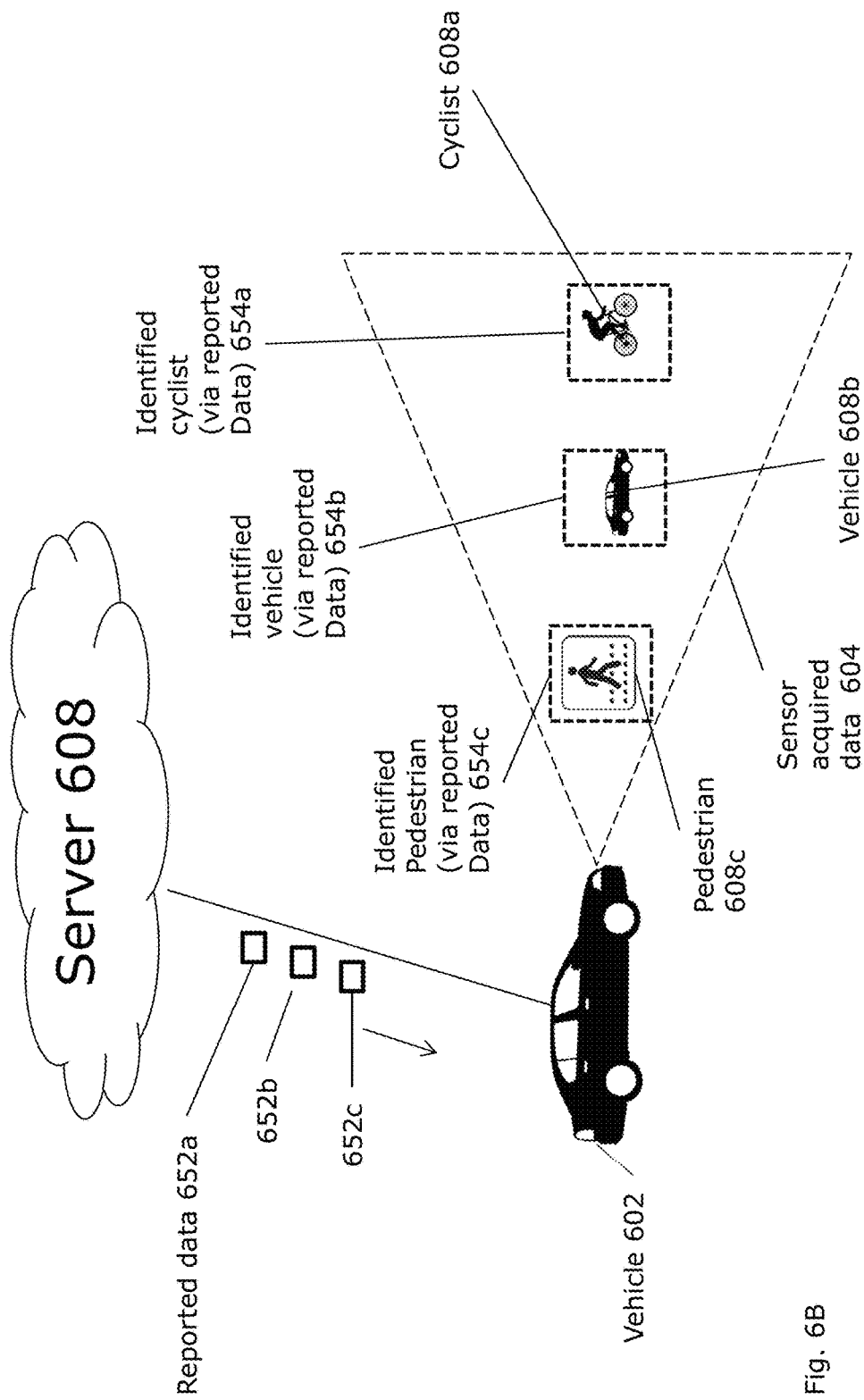

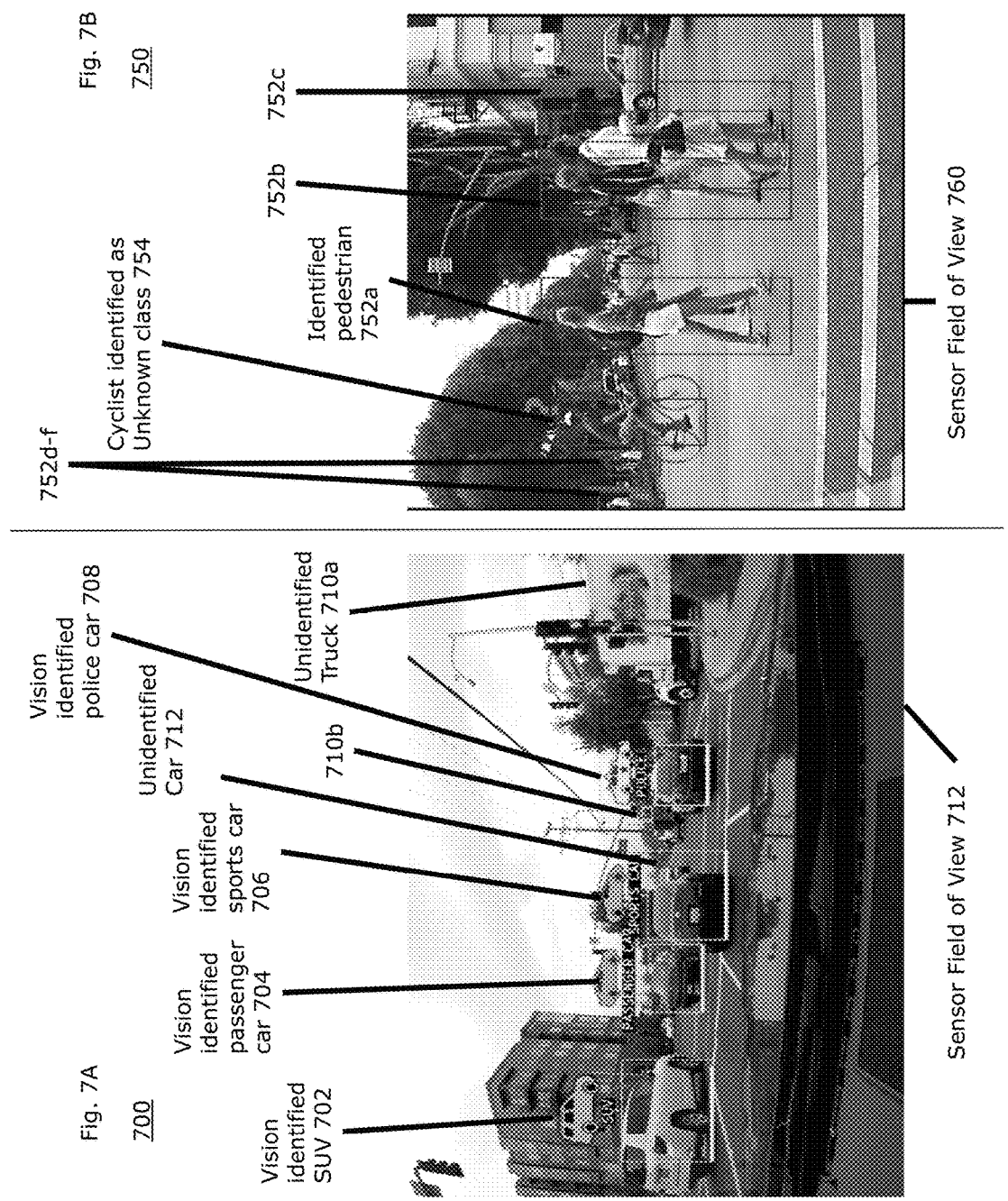

900
Reported object 906
Sensor Identified Objects 904
Sensor Field of View 902

800
Mobile Application 802
User Control 804
User Control 806

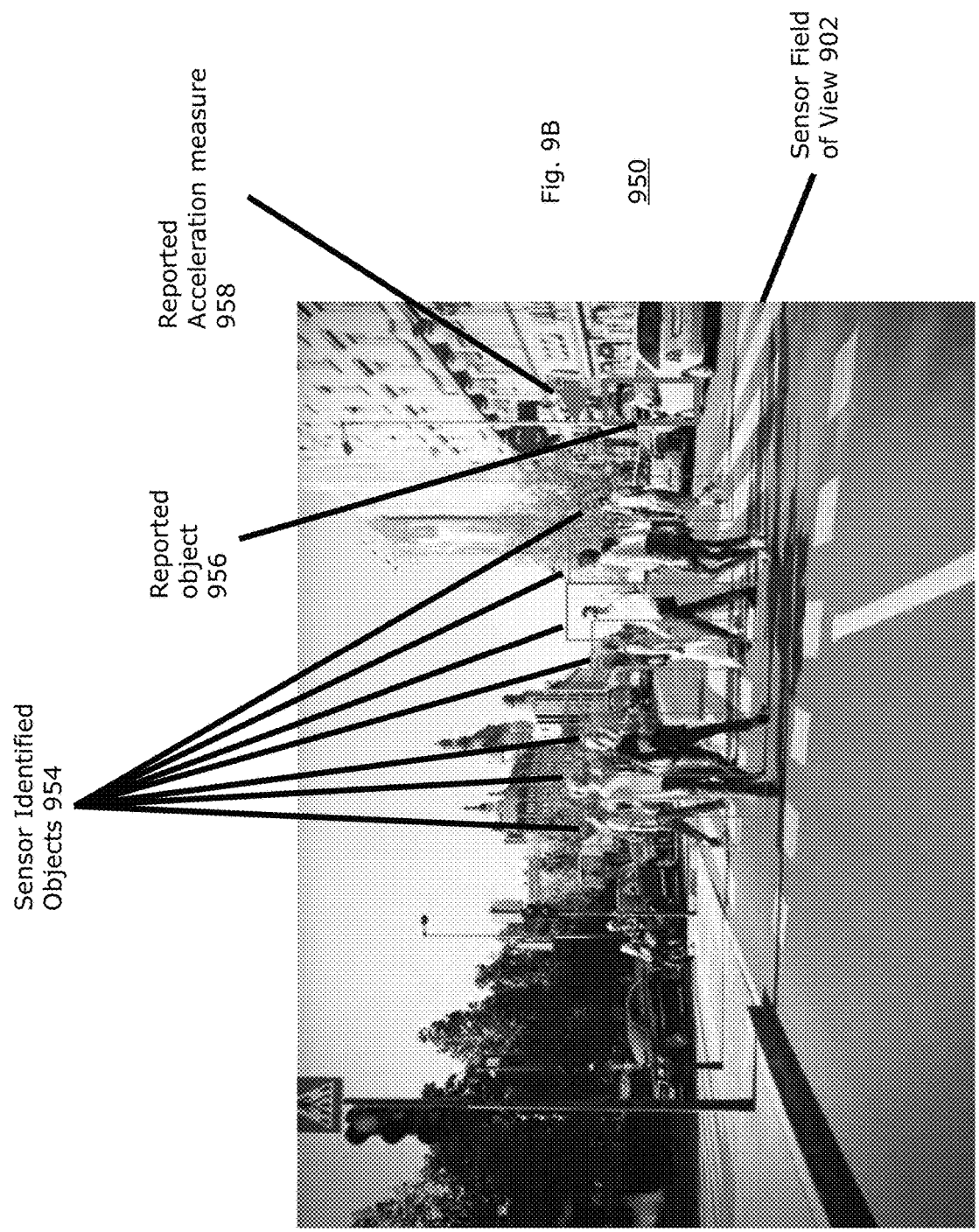

ENHANCING AUTONOMOUS VEHICLE PERCEPTION WITH OFF-VEHICLE COLLECTED DATA

BACKGROUND

Recently, image and other sensor systems have been developed to detect objects, and different object types, such as types of cars, pedestrians, and cyclists. These systems can further detect direction of movements, speed, and accelerations of these objects as well. However, these systems, while sufficient for certain tasks, can be hindered by limitations of range, field of view, or other measuring errors.

SUMMARY

For the purpose of this disclosure the term "autonomous vehicle" refers to a vehicle with autonomous functions, including semi-autonomous vehicles and fully-autonomous vehicles.

In an embodiment, a method includes receiving, at an autonomous vehicle, reported data regarding an object in proximity to the autonomous vehicle. The data is collected by a collecting device external to the autonomous vehicle, and is relayed to the autonomous vehicle via a server. The reported data includes a current location of the object, a type of the object, or a predicted location of the object. The method further includes determining, at the autonomous vehicle, whether the reported data of the object correlates with a found object in an object list. If the determination finds the found object in the object list, the method, adds the reported data of the object to data associated with the found object in the object list. Otherwise, the method adds the reported data of the object to an object list of objects detected by sensors from on-board the autonomous vehicle.

In another embodiment, the collective device can be an off-vehicle collecting device.

In an embodiment, the type of the object is a pedestrian, bicycle, vehicle, or vehicle type.

In an embodiment, the reported data includes location data collected from the collecting device of the object. The location data provides the current location of the object. A history of the location data can be used to predict future locations of the object. In an embodiment, the location data can be acquired using a global positioning system (GPS) receiver, cell-tower signals, WiFi signals, or other location sensing devices and methods.

In an embodiment, the type of the object is determined based on a vibration pattern of the collecting device, wherein the collecting device is a mobile device.

In an embodiment, the type of object is determined by a user of the mobile device self-identifying the type of object.

In an embodiment, the reported data further includes velocity and acceleration data of the object, a route map of the object, or a calendar of a user of the object. In an embodiment, the predicted location of the object is determined by loading the route map of the object, or by loading a destination location from the calendar of the user and generating a route map from the current location to the destination location.

In an embodiment, the method includes modifying a sensor model based on discrepancies between the reported data from the collection device and data from the on-board sensors of the autonomous vehicle. In another embodiment, the method includes building a sensor model based on the reported data from the collection device and data from the on-board sensors of the autonomous vehicle.

In an embodiment, the method further includes generating the reported data of the object the object by analyzing at least one image taken by the collecting device.

In an embodiment, the method further includes identifying the reported data as an emergency vehicle signal. The method can further include authenticating the reported data as the emergency vehicle signal.

In an embodiment, the method further includes reporting, from the autonomous vehicle to the server, a location and direction of the vehicle, such that the data returned from the server is related to a current and future locations of the autonomous vehicle.

In an embodiment, the data returned from the server is selected from a list of object data reported from multiple collecting devices stored at the server.

In an embodiment, the method further includes reporting, from the autonomous vehicle to the server, at least one of a location and direction of the vehicle, such that the responsively received data is related to the same location of the vehicle.

In an embodiment, one of the objects of the object list is determined by on-board sensors of the autonomous vehicle.

In an embodiment, a system includes a processor and a memory with computer code instructions stored therein. The memory is operatively coupled to said processor such that the computer code instructions configure the processor to implement a machine interaction controller. The machine interaction controller is configured to receive, at an autonomous vehicle, reported data regarding an object in proximity to the autonomous vehicle. The data is collected by a collecting device external to the autonomous vehicle and relayed to the autonomous vehicle via a server. The reported data includes a current location of the object, a type of the object, or a predicted location of the object. The memory and processor are further configured to implement a perception controller configured to determine, at the autonomous vehicle, whether the reported data of the object correlates with a found object in an object list, wherein at least one of the objects of the object list is determined by on-board sensors of the autonomous vehicle. If the determination finds the found object in the object list, the perception controller adds the reported data of the object to data associated with the found object in the object list. Otherwise, the perception controller adds the reported data of the object to an object list of objects detected by sensor from on-board sensors of the autonomous vehicle.

In an embodiment, a non-transitory computer-readable medium is configured to store instructions for providing data to an autonomous vehicle. The instructions, when loaded and executed by a processor, causes the processor to receive, at an autonomous vehicle, reported data regarding an object in proximity to the autonomous vehicle. The data is collected by a collecting device external to the autonomous vehicle and relayed to the autonomous vehicle via a server. The reported data includes a current location of the object, a type of the object, or a predicted location of the object. The instructions are further configured to determine, at the autonomous vehicle, whether the reported data of the object correlates with a found object in an object list, and if the determination finds the found object in the object list, add the reported data of the object to data associated with the found object in the object list, and otherwise, add the reported data of the object to an object list of objects detected by sensor from on-board sensors of the autonomous vehicle.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a diagram illustrating decision time scales of the ADC and VC.

FIG. 6B is a block diagram illustrating an example embodiment of the present disclosure.

FIG. 7A is a diagram illustrating an example embodiment of a representation of a vision field identified by an autonomous or semi-autonomous vehicle.

FIG. 7B is a diagram illustrating an example embodiment of a representation of a vision field identified by an autonomous or semi-autonomous vehicle.

FIG. 9B is a diagram of a sensor field of view employing the data received from the mobile application.

DETAILED DESCRIPTION

A description of example embodiments of the disclosure follows.

Figure 1:
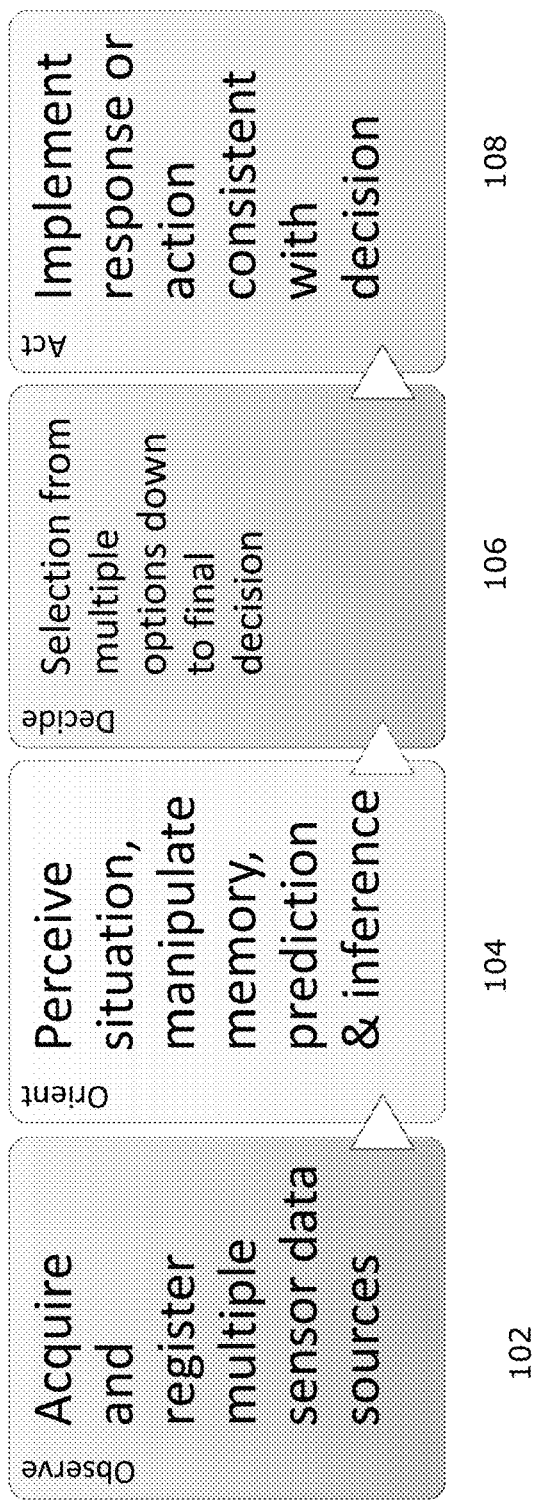
FIG. 1 is a diagram illustrating steps in an embodiment of an automated control system of the Observe, Orient, Decide, and Act (OODA) model.

FIG. 1 is a diagram illustrating steps in an embodiment of an automated control system of the Observe, Orient, Decide, and Act (OODA) model. Automated systems, such as highly-automated driving systems, or, self-driving cars, or autonomous vehicles, employ an OODA model. The observe virtual layer 102 involves sensing features from the world using machine sensors, such as laser ranging, radar, infrared, vision systems, or other systems. The orientation virtual layer 104 involves perceiving situational awareness based on the sensed information. Examples of orientation virtual layer activities are Kalman filtering, model based matching, machine or deep learning, and Bayesian predictions. The decide virtual layer 106 selects an action from multiple objects to a final decision. The act virtual layer 108 provides guidance and control for executing the decision.

Figure 2:
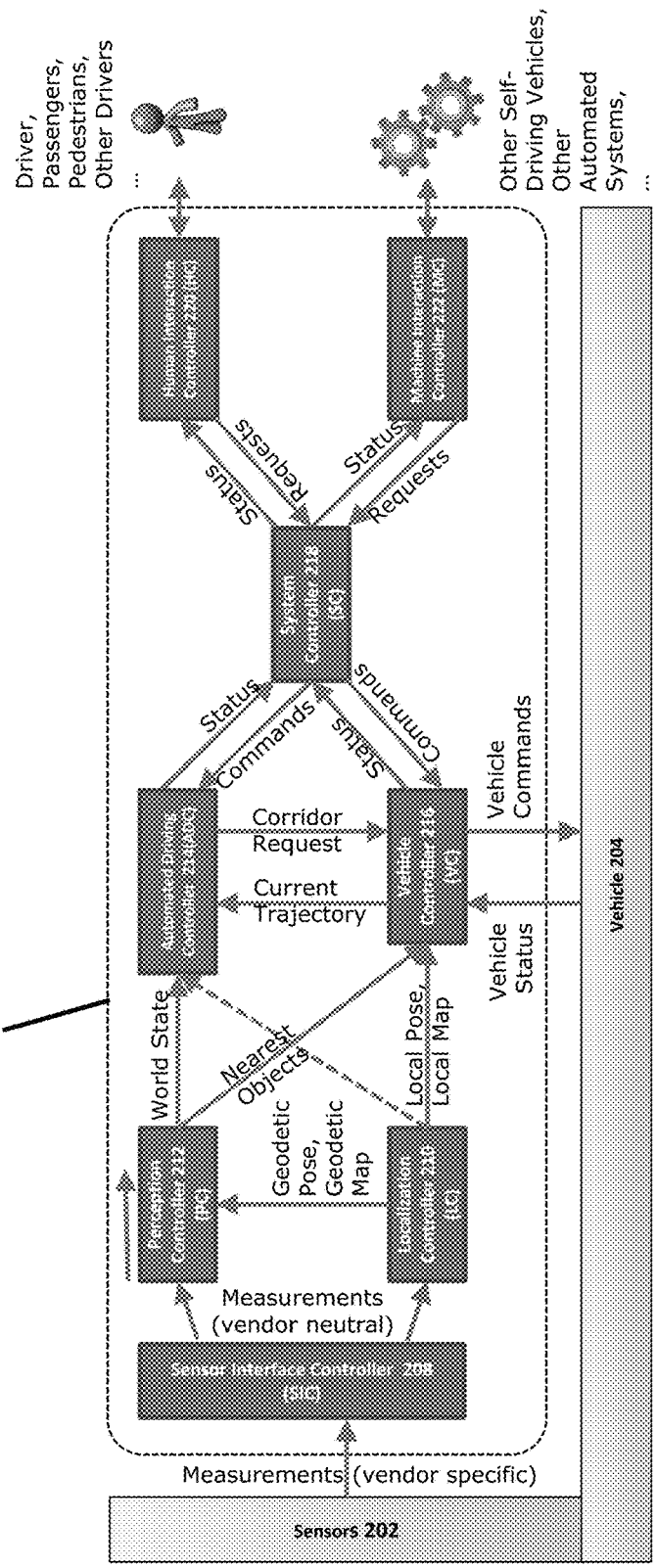
FIG. 2 is a block diagram of an embodiment of an autonomous vehicle high-level architecture.

FIG. 2 is a block diagram 200 of an embodiment of an autonomous vehicle high-level architecture 206. The architecture 206 is built using a top-down approach to enable fully automated driving. Further, the architecture 206 is preferably modular such that it can be adaptable with hardware from different vehicle manufacturers. The architecture 206, therefore, has several modular elements functionally divided to maximize these properties. In an embodiment, the modular architecture 206 described herein can interface with sensor systems 202 of any vehicle 204. Further, the modular architecture 206 can receive vehicle information from and communicate with any vehicle 204.

Elements of the modular architecture 206 include sensors 202, Sensor Interface Controller (SIC) 208, localization controller (LC) 210, perception controller (PC) 212, automated driving controller 214 (ADC), vehicle controller 216 (VC), system controller 218 (SC), human interaction controller 220 (HC) and machine interaction controller 222 (MC).

Referring again to the CODA model of FIG. 1, in terms of an autonomous vehicle, the observation layer of the model includes gathering sensor readings, for example, from vision sensors, Radar (Radio Detection And Ranging), LIDAR (Light Detection And Ranging), and Global Positioning Systems (GPS). The sensors 202 shown in FIG. 2 shows such an observation layer. Examples of the orientation layer of the model can include determining where a car is relative to the world, relative to the road it is driving on, and relative to lane markings on the road, shown by Perception Controller (PC) 212 and Localization Controller (LC) 210 of FIG. 2. Examples of the decision layer of the model include determining a corridor to automatically drive the car, and include elements such as the Automatic Driving Controller (ADC) 214 and Vehicle Controller (VC) 216 of FIG. 2. Examples of the act layer include converting that corridor into commands to the vehicle's driving systems (e.g., steering sub-system, acceleration sub-system, and breaking sub-system) that direct the car along the corridor, such as actuator control 410 of FIG. 4. A person of ordinary skill in the art can recognize that the layers of the system are not strictly sequential, and as observations change, so do the results of the other layers. For example, after the system chooses a corridor to drive in, changing conditions on the road, such as detection of another object, may direct the car to modify its corridor, or enact emergency procedures to prevent a collision. Further, the commands of the vehicle controller may need to be adjusted dynamically to compensate for drift, skidding, or other changes to expected vehicle behavior.

At a high level, the module architecture 206 receives measurements from sensors 202. While different sensors may output different sets of information in different formats, the modular architecture 206 includes Sensor Interface Controller (SIC) 208, sometimes also referred to as a Sensor Interface Server (SIS), configured to translate the sensor data into data having a vendor-neutral format that can be read by the modular architecture 206. Therefore, the modular architecture 206 learns about the environment around the vehicle 204 from the vehicle's sensors, no matter the vendor, manufacturer, or configuration of the sensors. The SIS 208 can further tag each sensor's data with a metadata tag having its location and orientation in the car, which can be used by the perception controller to determine the unique angle, perspective, and blind spot of each sensor.

Further, the modular architecture 206 includes vehicle controller 216 (VC). The VC 216 is configured to send commands to the vehicle and receive status messages from the vehicle. The vehicle controller 216 receives status messages from the vehicle 204 indicating the vehicle's status, such as information regarding the vehicle's speed, attitude, steering position, braking status, and fuel level, or any other information about the vehicle's subsystems that is relevant for autonomous driving. The modular architecture 206, based on the information from the vehicle 204 and the sensors 202, therefore can calculate commands to send from the VC 216 to the vehicle 204 to implement self-driving. The functions of the various modules within the modular architecture 206 are described in further detail below. However, when viewing the modular architecture 206 at a high level, it receives (a) sensor information from the sensors 202 and (b) vehicle status information from the vehicle 204, and in turn, provides the vehicle instructions to the vehicle 204. Such an architecture allows the modular architecture to be employed for any vehicle with any sensor configuration. Therefore, any vehicle platform that includes a sensor subsystem (e.g., sensors 202) and an actuation subsystem having the ability to provide vehicle status and accept driving commands (e.g., actuator control 410 of FIG. 4) can integrate with the modular architecture 206.

Within the modular architecture 206, various modules work together to implement automated driving according to the CODA model. The sensors 202 and SIC 208 reside in the "observe" virtual layer. As described above, the SIC 208 receives measurements (e.g., sensor data) having various formats. The SIC 208 is configured to convert vendor-specific data directly from the sensors to vendor-neutral data. In this way, the set of sensors 202 can include any brand of Radar, LIDAR, image sensor, or other sensors, and the modular architecture 206 can use their perceptions of the environment effectively.

Figure 3:
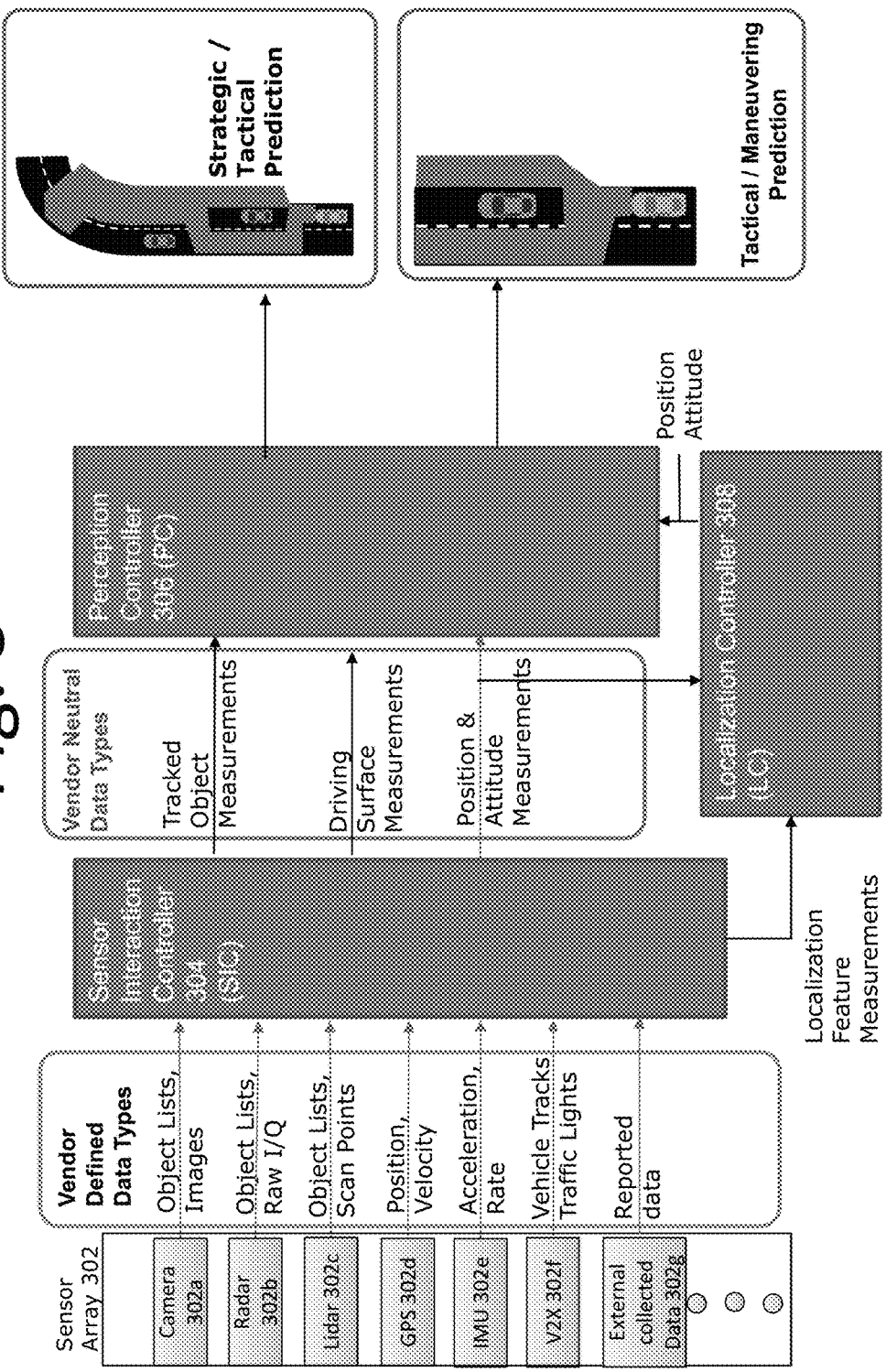
FIG. 3 is a block diagram illustrating an embodiment of the sensor interaction controller (SIC), perception controller (PC), and localization controller (LC).

The measurements output by the sensor interface server are then processed by perception controller (PC) 212 and localization controller (LC) 210. The PC 212 and LC 210 both reside in the "orient" virtual layer of the OODA model. The LC 210 determines a robust world-location of the vehicle that can be more precise than a GPS signal, and still determines the world-location of the vehicle when there is no available or an inaccurate GPS signal. The LC 210 determines the location based on GPS data and sensor data. The PC 212, on the other hand, generates prediction models representing a state of the environment around the car, including objects around the car and state of the road. FIG. 3 provides further details regarding the SIC 208, LC 210 and PC 212.

Figure 4:
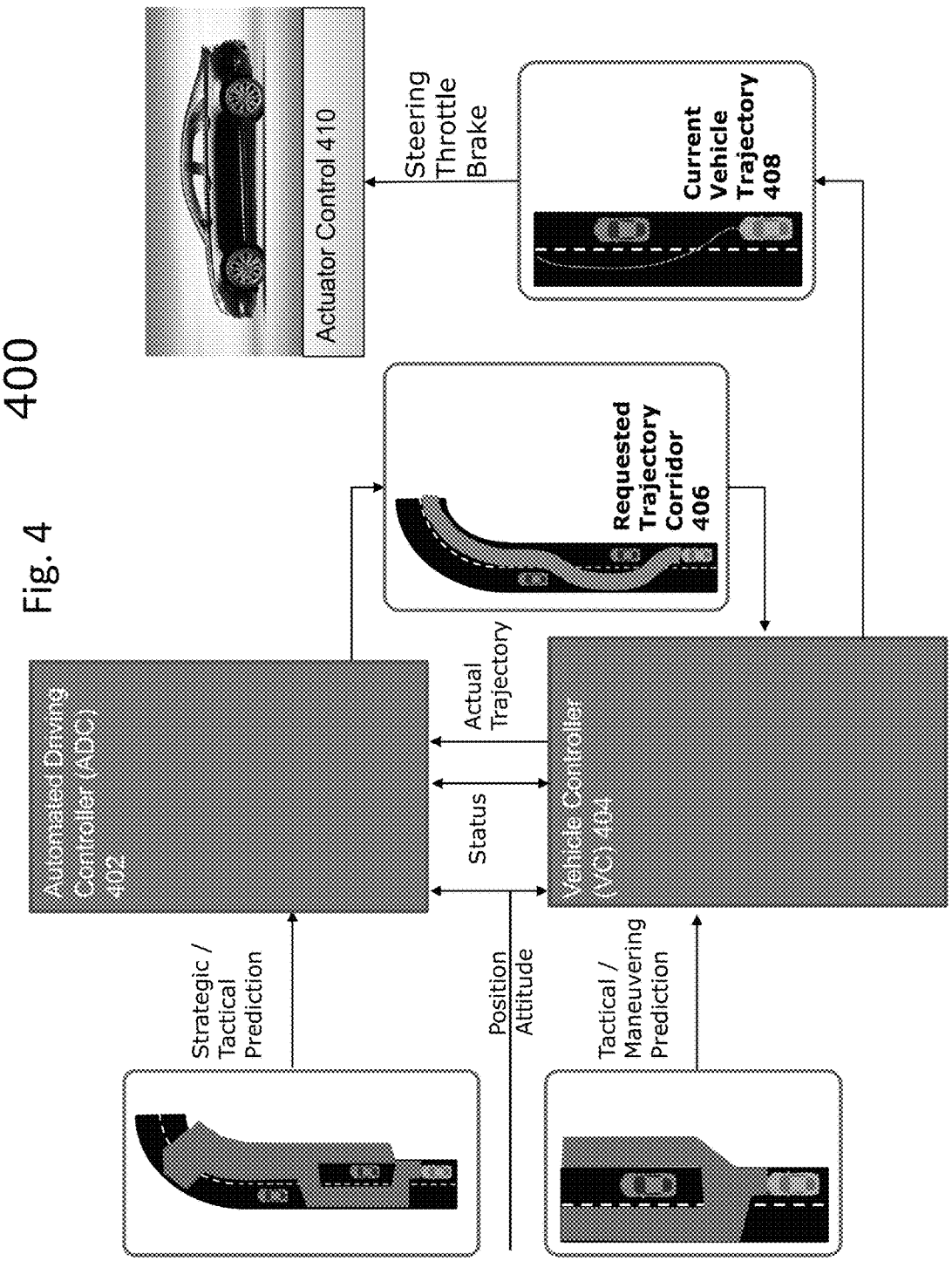
FIG. 4 is a block diagram illustrating an example embodiment of the automatic driving controller (ADC), vehicle controller (VC) and actuator controller.

Automated driving controller 214 (ADC) and vehicle controller 216 (VC) receive the outputs of the perception controller and localization controller. The ADC 214 and VC 216 reside in the "decide" virtual layer of the OODA model. The ADC 214 is responsible for destination selection, route and lane guidance, and high-level traffic surveillance. The ADC 214 further is responsible for lane selection within the route, and identification of safe harbor areas to diver the vehicle in case of an emergency. In other words, the ADC 214 selects a route to reach the destination, and a corridor within the route to direct the vehicle. The ADC 214 passes this corridor onto the VC 216. Given the corridor, the VC 216 provides a trajectory and lower level driving functions to direct the vehicle through the corridor safely. The VC 216 first determines the best trajectory to maneuver through the corridor while providing comfort to the driver, an ability to reach safe harbor, emergency maneuverability, and ability to follow the vehicle's current trajectory. In emergency situations, the VC 216 overrides the corridor provided by the ADC 214 and immediately guides the car into a safe harbor corridor, returning to the corridor provided by the ADC 214 when it is safe to do so. The VC 216, after determining how to maneuver the vehicle, including safety maneuvers, then provides actuation commands to the vehicle 204, which executes the commands in its steering, throttle, and braking subsystems. This element of the VC 216 is therefore in the "act" virtual layer of the OODA model. FIG. 4 describes the ADC 214 and VC 216 in further detail.

The modular architecture 206 further coordinates communication with various modules through system controller 218 (SC). By exchanging messages with the ADC 214 and VC 216, the SC 218 enables operation of human interaction controller 220 (HC) and machine interaction controller 222 (MC). The HC 220 provides information about the autonomous vehicle's operation in a human understandable format based on status messages coordinated by the system controller. The HC 220 further allows for human input to be factored into the car's decisions. For example, the HC 220 enables the operator of the vehicle to enter or modify the destination or route of the vehicle, as one example. The SC 218 interprets the operator's input and relays the information to the VC 216 or ADC 214 as necessary.

Further, the MC 222 can coordinate messages with other machines or vehicles. For example, other vehicles can electronically and wirelessly transmit route intentions, intended corridors of travel, and sensed objects that may be in other vehicle's blind spot to autonomous vehicles, and the MC 222 can receive such information, and relay it to the VC 216 and ADC 214 via the SC 218. In addition, the MC 222 can send information to other vehicles wirelessly. In the example of a turn signal, the MC 222 can receive a notification that the vehicle intends to turn. The MC 222 receives this information via the VC 216 sending a status message to the SC 218, which relays the status to the MC 222. However, other examples of machine communication can also be implemented. For example, other vehicle sensor information or stationary sensors can wirelessly send data to the autonomous vehicle, giving the vehicle a more robust view of the environment. Other machines may be able to transmit information about objects in the vehicles blind spot, for example. In further examples, other vehicles can send their vehicle track. In an even further examples, traffic lights can send a digital signal of their status to aid in the case where the traffic light is not visible to the vehicle. A person of ordinary skill in the art can recognize that any information employed by the autonomous vehicle can also be transmitted to or received from other vehicles to aid in autonomous driving. FIG. 6 shows the HC 220, MC 222, and SC 218 in further detail.

FIG. 3 is a block diagram 300 illustrating an embodiment of the sensor interaction controller 304 (SIC), perception controller (PC) 306, and localization controller (LC) 308. A sensor array 302 of the vehicle can include various types of sensors, such as a camera 302a, radar 302b, LIDAR 302c, GPS 302d, IMU 302e, vehicle-to-everything (V2X) 302f, or external collected data 302g (e.g., from a mobile device). Each sensor sends individual vendor defined data types to the SIC 304. For example, the camera 302a sends object lists and images, the radar 302b sends object lists, and in-phase/quadrature (IQ) data, the LIDAR 302c sends object lists and scan points, the GPS 302d sends position and velocity, the IMU 302e sends acceleration data, and the V2X 302f controller sends tracks of other vehicles, turn signals, other sensor data, or traffic light data. A person of ordinary skill in the art can recognize that the sensor array 302 can employ other types of sensors, however. The SIC 304 monitors and diagnoses faults at each of the sensors 302a-f. The SIC 304 processes external collected data 302g received from mobile devices associated with objects. In addition, the SIC 304 isolates the data from each sensor from its vendor specific package and sends vendor neutral data types to the perception controller (PC) 306 and localization controller 308 (LC). The SIC 304 forwards localization feature measurements and position and attitude measurements to the LC 308, and forwards tracked object measurements, driving surface measurements, and position & attitude measurements to the PC 306. The SIC 304 can further be updated with firmware so that new sensors having different formats can be used with the same modular architecture.

The LC 308 fuses GPS and IMU data with Radar, Lidar, and Vision data to determine a vehicle location, velocity, and attitude with more precision than GPS can provide alone. The LC 308 then reports that robustly determined location, velocity, and attitude to the PC 306. The LC 308 further monitors measurements representing position, velocity, and attitude data for accuracy relative to each other, such that if one sensor measurement fails or becomes degraded, such as a GPS signal in a city, the LC 308 can correct for it. The PC 306 identifies and locates objects around the vehicle based on the sensed information. The PC 306 further estimates drivable surface regions surrounding the vehicle, and further estimates other surfaces such as road shoulders or drivable terrain in the case of an emergency. The PC 306 further provides a stochastic prediction of future locations of objects. The PC 306 further stores a history of objects and drivable surfaces.

The PC 306 outputs two predictions, a strategic prediction, and a tactical prediction. The tactical prediction represents the world around 2-4 seconds into the future, which only predicts the nearest traffic and road to the vehicle. This prediction includes a free space harbor on shoulder of the road or other location. This tactical prediction is based entirely on measurements from sensors on the vehicle of nearest traffic and road conditions.

The strategic prediction is a long term prediction that predicts areas of the car's visible environment beyond the visible range of the sensors. This prediction is for greater than four seconds into the future, but has a higher uncertainty than the tactical prediction because objects (e.g., cars and people) may change their currently observed behavior in an unanticipated manner. Such a prediction can also be based on sensor measurements from external sources including other autonomous vehicles, manual vehicles with a sensor system and sensor communication network, sensors positioned near or on the roadway or received over a network from transponders on the objects, and traffic lights, signs, or other signals configured to communicate wirelessly with the autonomous vehicle.

FIG. 4 is a block diagram 400 illustrating an example embodiment of the automatic driving controller (ADC) 402, vehicle controller (VC) 404 and actuator controller 410. The ADC 402 and VC 404 execute the "decide" virtual layer of the CODA model.

The ADC 402, based on destination input by the operator and current position, first creates an overall route from the current position to the destination including a list of roads and junctions between roads in order to reach the destination. This strategic route plan may be based on traffic conditions, and can change based on updating traffic conditions, however such changes are generally enforced for large changes in estimated time of arrival (ETA). Next, the ADC 402 plans a safe, collision-free, corridor for the autonomous vehicle to drive through based on the surrounding objects and permissible drivable surface—both supplied by the PC. This corridor is continuously sent as a request to the VC 404 and is updated as traffic and other conditions change. The VC 404 receives the updates to the corridor in real time. The ADC 402 receives back from the VC 404 the current actual trajectory of the vehicle, which is also used to modify the next planned update to the driving corridor request.

The ADC 402 generates a strategic corridor for the vehicle to navigate. The ADC 402 generates the corridor based on predictions of the free space on the road in the strategic/tactical prediction. The ADC 402 further receives the vehicle position information and vehicle attitude information from the perception controller of FIG. 3. The VC 404 further provides the ADC 402 with an actual trajectory of the vehicle from the vehicle's actuator control 410. Based on this information, the ADC 402 calculates feasible corridors to drive the road, or any drivable surface. In the example of being on an empty road, the corridor may follow the lane ahead of the car.

In another example of the car attempting to pass a second car, the ADC 402 can determine whether there is free space in a passing lane and in front of the car to safely execute the pass. The ADC 402 can automatically calculate based on (a) the current distance to the second car to be passed, (b) amount of drivable road space available in the passing lane, (c) amount of free space in front of the second car to be passed, (d) speed of the vehicle to be passed, (e) current speed of the autonomous vehicle, and (f) known acceleration of the autonomous vehicle, a corridor for the vehicle to travel through to execute the pass maneuver.

In another example, the ADC 402 can determine a corridor to switch lanes when approaching a highway exit. In addition to all of the above factors, the ADC 402 monitors the planned route to the destination and, upon approaching a junction, calculates the best corridor to safely and legally continue on the planned route.

The ADC 402 the provides the requested corridor 406 to the VC 404, which works in tandem with the ADC 402 to allow the vehicle to navigate the corridor. The requested corridor 406 places geometric and velocity constraints on any planned trajectories for a number of seconds into the future. The VC 404 determines a trajectory to maneuver within the corridor 406. The VC 404 bases its maneuvering decisions from the tactical/maneuvering prediction received from the perception controller and the position of the vehicle and the attitude of the vehicle. As described previously, the tactical/maneuvering prediction is for a shorter time period, but has less uncertainty. Therefore, for lower-level maneuvering and safety calculations, the VC 404 effectively uses the tactical/maneuvering prediction to plan collision-free trajectories within requested corridor 406. As needed in emergency situations, the VC 404 plans trajectories outside the corridor 406 to avoid collisions with other objects.

The VC 404 then determines, based on the requested corridor 406, the current velocity and acceleration of the car, and the nearest objects, how to drive the car through that corridor 406 while avoiding collisions with objects and remain on the drivable surface. The VC 404 calculates a tactical trajectory within the corridor, which allows the vehicle to maintain a safe separation between objects. The tactical trajectory also includes a backup safe harbor trajectory in the case of an emergency, such as a vehicle unexpectedly decelerating or stopping, or another vehicle swerving in front of the autonomous vehicle.

As necessary to avoid collisions, the VC 404 may be required to command a maneuver suddenly outside of the requested corridor from the ADC 402. This emergency maneuver can be initiated entirely by the VC 404 as it has faster response times than the ADC 402 to imminent collision threats. This capability isolates the safety critical collision avoidance responsibility within the VC 404. The VC 404 sends maneuvering commands to the actuators that control steering, throttling, and braking of the vehicle platform.

The VC 404 executes its maneuvering strategy by sending a current vehicle trajectory 408 having driving commands (e.g., steering, throttle, braking) to the vehicle's actuator controls 410. The vehicle's actuator controls 410 apply the commands to the car's respective steering, throttle, and braking systems. The VC 404 sending the trajectory 408 to the actuator controls represent the "Act" virtual layer of the CODA model. By conceptualizing the autonomous vehicle architecture in this way, the VC is the only component needing configuration to control a specific model of car (e.g., format of each command, acceleration performance, turning performance, and braking performance), whereas the ADC remaining highly agnostic to the specific vehicle capacities. In an example, the VC 404 can be updated with firmware configured to allow interfacing with particular vehicle's actuator control systems, or a fleet-wide firmware update for all vehicles.

FIG. 5 is a diagram 500 illustrating decision time scales of the ADC 402 and VC 404. The ADC 402 implements higher-level, strategic 502 and tactical 504 decisions by generating the corridor. The ADC 402 therefore implements the decisions having a longer range/or time scale. The estimate of world state used by the ADC 402 for planning strategic routes and tactical driving corridors for behaviors such as passing or making turns has higher uncertainty, but predicts longer into the future, which is necessary for planning these autonomous actions. The strategic predictions have high uncertainty because they predict beyond the sensor's visible range, relying solely on non-vision technologies, such as Radar, for predictions of objects far away from the car, that events can change quickly due to, for example, a human suddenly changing his or her behavior, or the lack of visibility of objects beyond the visible range of the sensors. Many tactical decisions, such as passing a car at highway speed, require perception Beyond the Visible Range (BVR) of an autonomous vehicle (e.g., 100 m or greater), whereas all maneuverability 506 decisions are made based on locally perceived objects to avoid collisions.

The VC 404, on the other hand, generates maneuverability decisions 506 using maneuverability predictions that are short time frame/range predictions of object behaviors and the driving surface. These maneuverability predictions have a lower uncertainty because of the shorter time scale of the predictions, however, they rely solely on measurements taken within visible range of the sensors on the autonomous vehicle. Therefore, the VC 404 uses these maneuverability predictions (or estimates) of the state of the environment immediately around the car for fast response planning of collision-free trajectories for the autonomous vehicle. The VC 402 issues actuation commands, on the lowest end of the time scale, representing the execution of the already planned corridor and maneuvering through the corridor.

Figure 6A:
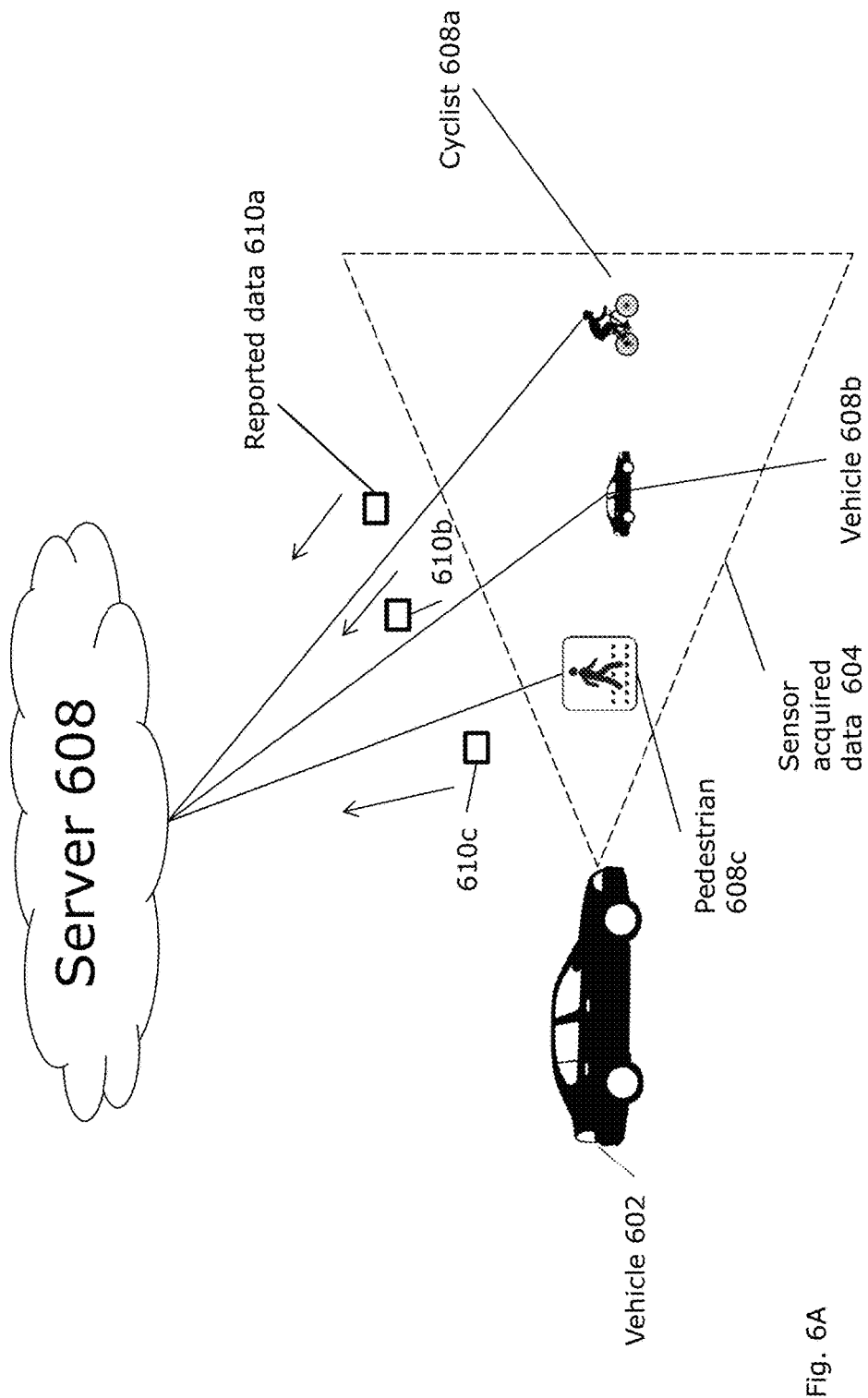
FIG. 6A is a block diagram illustrating an example embodiment of the present disclosure.

FIG. 6A is a block diagram 600 illustrating an example embodiment of the present disclosure. A autonomous or semi-autonomous vehicle 602 includes a plurality of sensors, as described above. Using those sensors, the vehicle has a field of view including sensor acquired data 604. In the example of FIG. 6A, the vehicle detects a cyclist 608a, vehicle 608b, and pedestrian 608c. The vehicle may automatically categorize the detected objects 608a-c as a respective cyclist, vehicle, and pedestrian, or it may lack the information to do so accurately. The vehicle's sensors may be obscured from the objects 608a-c by lacking a line of sight, or by other interference, for example. In addition, other objects may be in the path of the vehicle 602, but not in the sensor acquired data 604. Therefore, each object 608a-c includes or carries a mobile device external to the autonomous vehicle having a transmitter, or carries a separate dedicated transmitter, that transmits reported data 610a-c, respectively, to a server 608. The server, therefore, maintains a list of reported data collected by multiple devices, and determines which data of the list to distribute to each autonomous vehicle. The server may maintain its list of object by a variety of methods, including time-limiting data in the list, such that data beyond a given time threshold is automatically deleted. The mobile device can also be a collecting device external to the autonomous vehicle. The reported data 610a-c can include a current location of the object (e.g., GPS location), a type of the object (e.g., pedestrian, cyclist, motorist, or type of vehicle), a predicted location of the object (e.g., based on detected current velocity and direction of object and map data), and social media or personal information of the user. Social media information can employ calendar or events information to determine a destination of the user. From there, the vehicle can determine a best route from the current location to the destination, and predict a location or direction of the user. This is especially useful with pedestrians and cyclists, who may not be using a GPS application that can relay its GPS route to the server automatically like a motorist may do. Therefore, the reported data 610a-c comes from the objects 608a-c themselves, and does not originate from a sensor of the vehicle 602.

FIG. 6B is a block diagram 650 illustrating an example embodiment of the present disclosure. FIG. 6B is a logical continuation of FIG. 6A. After the reported data 610a-c is sent from the objects 608a-c to the server 608, the server relays the reported data 652a-c. In embodiments, the server 608 can relay the data as received from the objects 608a-c, or can aggregate or otherwise modify the data 610a-c to create reported data 652a-c. The server 608 can also predict effects of propagation delay of the Internet signal in the relayed reported data 652a-c. The vehicle 602 receives the reported data 652a-c. In an embodiment, the vehicle 602 sends the reported data to its perception controller module, such as perception controller 212 of FIG. 2. In relation to FIG. 2, the reported data 652a-c can be conceptually considered as an input of the sensors 202. FIG. 3 illustrates this concept further, by showing external collected data 302g as an input of the sensor array, sending reported data to the sensor interaction controller 304, which relays vender neutral data types to the perception controller 306.

Therefore, the external collected data input 302g of FIG. 3 can further assist the vehicle 602 in object types, or even additional objects. For example, after receiving the reported data 652a-c, the vehicle identifies the cyclist 608a as identified cyclist 654a, the vehicle 608b as identified vehicle 654b, and the pedestrian 608c as identified pedestrian 654c. The reported data 654a-c can include a current location of the object, a type of the object, and a predicted location of the object. This information can be correlated with already detected objects and their location relative to the car.

Therefore, the reported data 654*a-c* can provide the following advantages to the vehicle 602. First, the vehicle 602 can use the reported data 654*a-c* to verify a class of object that is already detected by the car to be correct. Second, the vehicle 602 can use the reported data 654*a-c* to identify a class of object that was previously detected, but of an undetermined type. Third, the vehicle 602 can use the reported data 654*a-c* to correct an incorrectly determined class of object. Fourth, the vehicle 602 can use the reported data 654*a-c* to detect a previously undetected object. Fifth, the vehicle 602 can use the reported data 654*a-c* to determine that a previously detected object is, in reality, two or more separate objects that were difficult for other sensor types to differentiate. Sixth, the vehicle 602 can use the reported data 654*a-c* to detect an objects movement or intentions.

A person of ordinary skill in the art can further recognize that the reported data 652*a-c* can be reported to multiple vehicles, as long as the server has determined the objects in the reported data 652*a-c* is relevant to each vehicle. Therefore, each vehicle can received reported data custom to its route and location, as illustrated in further detail below in relation to FIG. 6D.

In an embodiment, the reported data 654*a-c* can include an indication and authentication of an emergency vehicle mode. Then, other vehicles in the area can automatically know that an emergency vehicle is approaching, and react accordingly by decelerating and approaching the side of the road until the emergency vehicle passes.

Most autonomous vehicles rely solely on their on-board sensors. However, some systems accept data from outside of the vehicle itself though a vehicle to infrastructure (V2I) and vehicle to anything (V2X) or vehicle to vehicle (V2V) radios. In V2I, V2X, and V2V, these radios are built for a special purpose and only built for cars. Therefore, a ubiquitous mobile device, such as an iPhone®, Android® Smartphone, or Windows® Phone cannot communicate with a car via those interfaces without adding additional hardware. Therefore, Applicant's present disclosure overcomes these limitation by taking advantage of more common network standards.

Utilizing the commonly known networks of V2I, V2X, and V2V have limited range because of their peer-to-peer nature, being a special radio made for special frequencies. However, broadcasting over a universal network, such as the Internet, means that the packet transfers can be targeted to any vehicle in a certain location. For example, the vehicle only needs to know about objects being reported in its vicinity, not in other countries, states/provinces, or even city blocks. Therefore, a packet exchange process can occur, where the vehicle notifies the server of its location and direction, and the server relays packets related to that location. In such a manner, the present method and system provide flexibility to deliver the correct data to the correct vehicles, where the V2I, V2X, and V2V provide data to all receivers within range of the radios. Therefore, in some scenarios, the present system allows object detection at a further range, but can also exclude packets that are irrelevant to the recipient (e.g., objects that the car has already passed, etc.).

The market penetration of V2I, V2X, and V2V is far less compared to the market penetration with LTE/Internet connected smartphones. In short, LTE has scaled better than V2I, V2X, and V2V, and therefore is a more effective technology to accomplish the goals of the present application, once certain challenges are overcome.

Internet services today (e.g., Waze and Google Maps) report the general level of traffic congestion on a road, but do not report the locations of individual cars or objects in real time. For example, the application Waze® does allow user reporting of incidents, such as traffic backups, road construction, law enforcement locations, and accidents. However, these reports are limited in the sense that they are not dynamic once reported, and further are not reported in real time by a device associated with the object being reported. Waze's reports do not allow for the precise location accuracy of the present disclosure. Waze's reports, rather, report where on a route an incident is, but are agnostic to where exactly the incident on the road is. In other words, Waze's precision is one-dimensional with regards to the route, in that it reports incidents on a mile/foot marker on a given road. However, Waze lacks the two-dimensional capacity of embodiments of the present disclosure, to detect the presence of objects not only at a certain range of the road, but on the road's width as well. Further still, Applicant's disclosure can report movement of individual objects in real time, instead of relying on a momentary report of a user that is not updated.

Figure 6C:
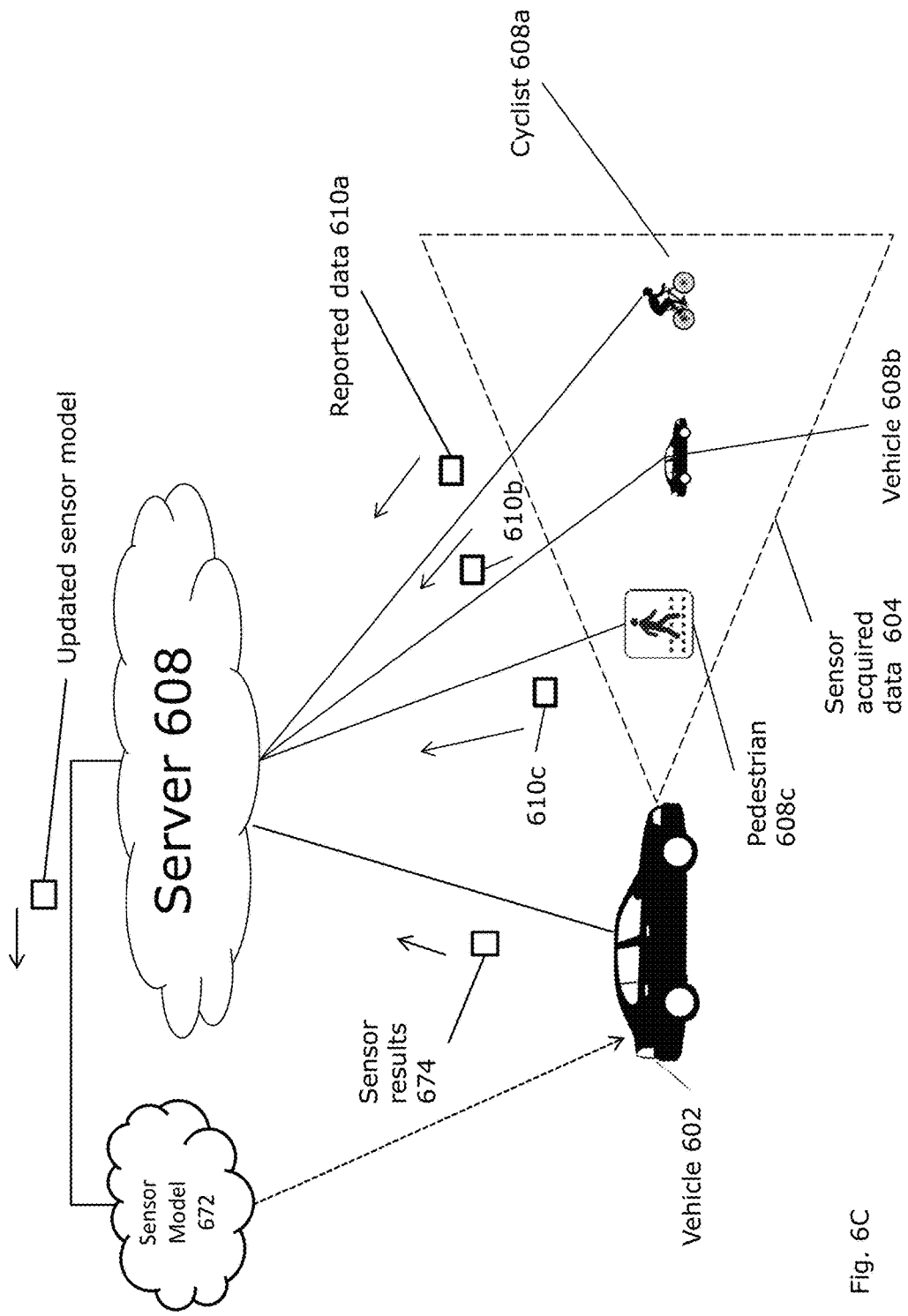
FIG. 6C is a block diagram illustrating an example embodiment of another aspect of the present disclosure.

FIG. 6C is a block diagram 670 illustrating an example embodiment of another aspect of the present disclosure. In response to the reported data 610*a-c* and a sensor result 674 being sent to the server 608, the server 608 calculates an updated sensor model 672, which can be sent to new vehicles or as an update to existing vehicles. As one example, the differences (or delta) between the reported data 610*a-c* and sensor result 674 can be used to adjust the updated sensor model 672. Optionally, the sensor model 672 can be sent back to the vehicle 602 (e.g., as a download, firmware update, or real-time update, etc.).

Figure 6D:
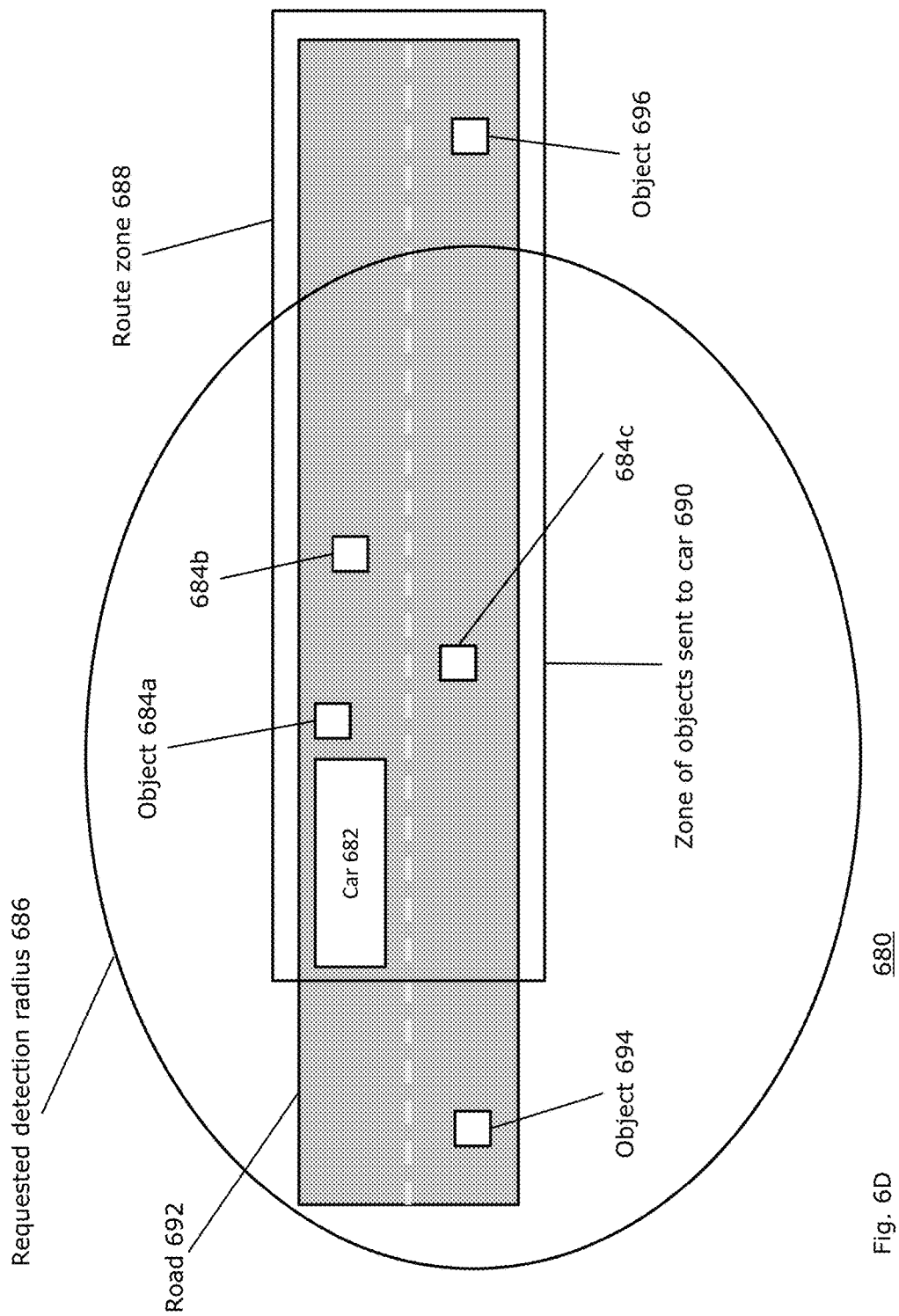
FIG. 6D is a block diagram illustrating an example embodiment of another aspect of the present disclosure.

FIG. 6D is a block diagram 680 illustrating an example embodiment of another aspect of the present disclosure. A car 682 is on a road 692, and receives initial or additional information about objects 684*a-c* that are within the zone of objects sent to the car 690. The zone of objects sent to the car is an intersection of a route zone 688 that tracks the road in the direction of motion of the car and a requested detection radius 686 that is a particular distance from the car. The route zone 688 is a region of interest requested by the vehicle. The region of interest is a parametrically defined corridor that can be any shape based on predicted paths or corridors of the vehicle. In other words, the route zone 688 is a geo-filter boundary requested by the vehicle. Therefore, information on object 694, which is in the requested detection radius 686 but not in the route zone 688, and object 696, which is in the route zone 688 but not the requested detection radius 686, are filtered from being sent to the car 682. A person of ordinary skill in the art can recognize that shapes other than circles can be used for the requested detection radius 686. Further, a person of ordinary skill in the art can recognize that the route zone 688 can track curved roads, routes with turns onto multiple roads, or an area slightly greater than the road to detect objects on sidewalks or parking lots.

FIG. 7A is a diagram 700 illustrating an example embodiment of a representation of a vision field identified by an autonomous or semi-autonomous vehicle. In relation to FIGS. 7A-7B, the sensor field of view 712 discussed can be derived from any of a vision system, LIDAR, RADAR system, other sensor system, or any combination of traditional sensing systems. These traditional systems detect objects within the sensor field of view 712, such as vision identified SUV 702, vision identified passenger car 704, vision identified sports car 706, vision identified police car

708. RADAR, LIDAR, and camera vision systems can combine their gathered information to determine the location of the relative vehicles, and the vehicle types. However, while these systems have a high degree of accuracy, these systems can sometimes have incomplete information, and not detect various objects. FIG. 7A shows the example of an unidentified trucks 710*a-b* can be undetected by the vehicle's traditional system by being not completely in a field of vision, or being obscured by other objects, such as the police car 708 obscuring the unidentified truck 710*b*. Further, the sports car 706 obscures the unidentified car 712. Other unidentified objects can be concealed from sensors in other ways, such as being out of range or being camouflaged with respect to the sensor type.

FIG. 7B is a diagram 750 illustrating an example embodiment of a representation of a vision field identified by an autonomous or semi-autonomous vehicle. In the sensor field of view 760, the pedestrians 752*a-f* are identified by the vehicle. Further, a cyclist is identified 754, but the vehicle cannot identify its class (e.g., whether it is a pedestrian, cyclist, or other object). Further, a person of ordinary skill in the art can recognize that cars and other objects are left unrecognized within the sensor field of view 760.

Figure 8:
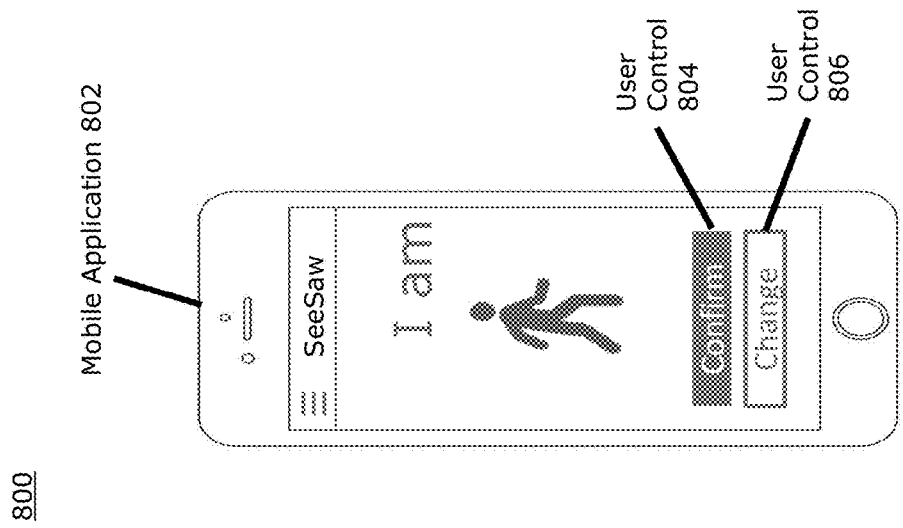
FIG. 8 is a diagram of an example mobile application running on a mobile device.

FIG. 8 is a diagram 800 of an example mobile application 802 running on a mobile device. The application identifies the type of traffic represented by the user self-identifying its type by using the user control 806. The types can include pedestrian, cyclist, and motorist. The user can select its type on the mobile application and submit it using user control 804, or the mobile application 802 can determine the type automatically based on the user's speed and motion pattern. For example, the mobile application 802 can determine motion of the mobile device in a user's pocket to be walking, running, or cycling based on its vibration. Further, the mobile application 802 can determine speeds over a threshold are those of a vehicle, and therefore register the user as a motorist.

Figure 9A:
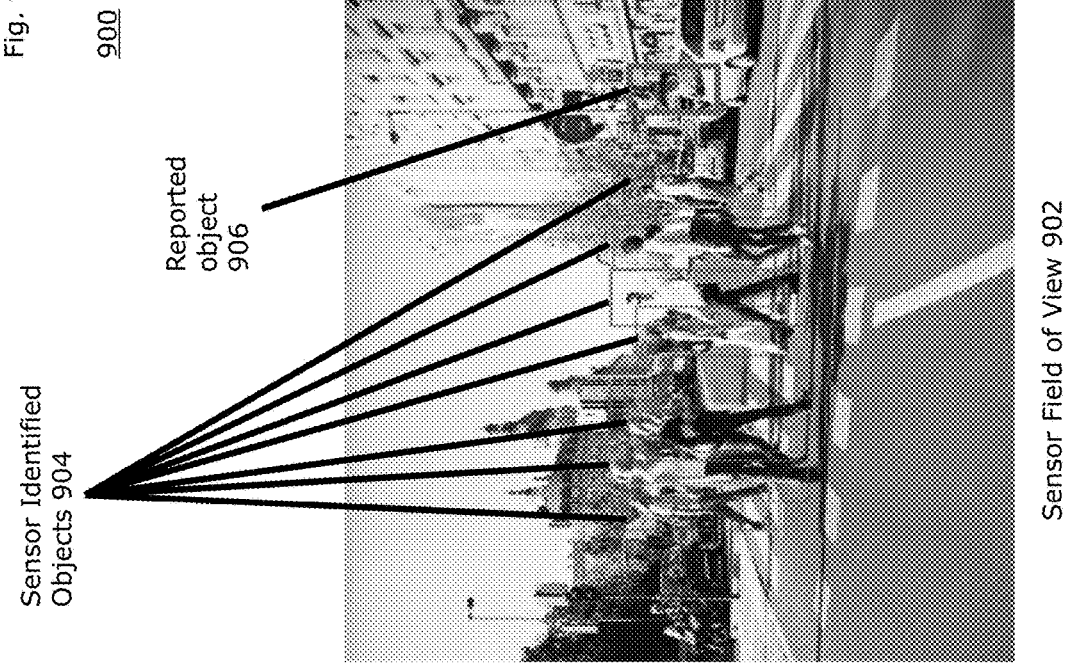
FIG. 9A is a diagram of a sensor field of view employing the data received from the mobile application.

FIG. 9A is a diagram of a sensor field of view 902 employing the data received from the mobile application. Within the sensor field of view, the sensor identifies several objects/pedestrians 904. However, it does not recognize a pedestrian near the sidewalk, about to cross outside of the cross walk. With the mobile application and its reported data, the mobile device sends a signal to a server which is relayed to the vehicle. Even with no visual, RADAR, or LIDAR knowledge of the pedestrian, the reported object's location can be made known to the vehicle. Likewise, FIG. 9B is a diagram of a sensor field of view 902 employing the data received from the mobile application. Within the sensor field of view 902, the sensor identifies several objects/pedestrians 954. Based on the mobile data, the vehicle recognize the reported object 956. However, in this embodiment, the vehicle also recognizes the reported acceleration measure 958. In other embodiments, the acceleration measure can also be or include a velocity or direction measure.

Figure 10:
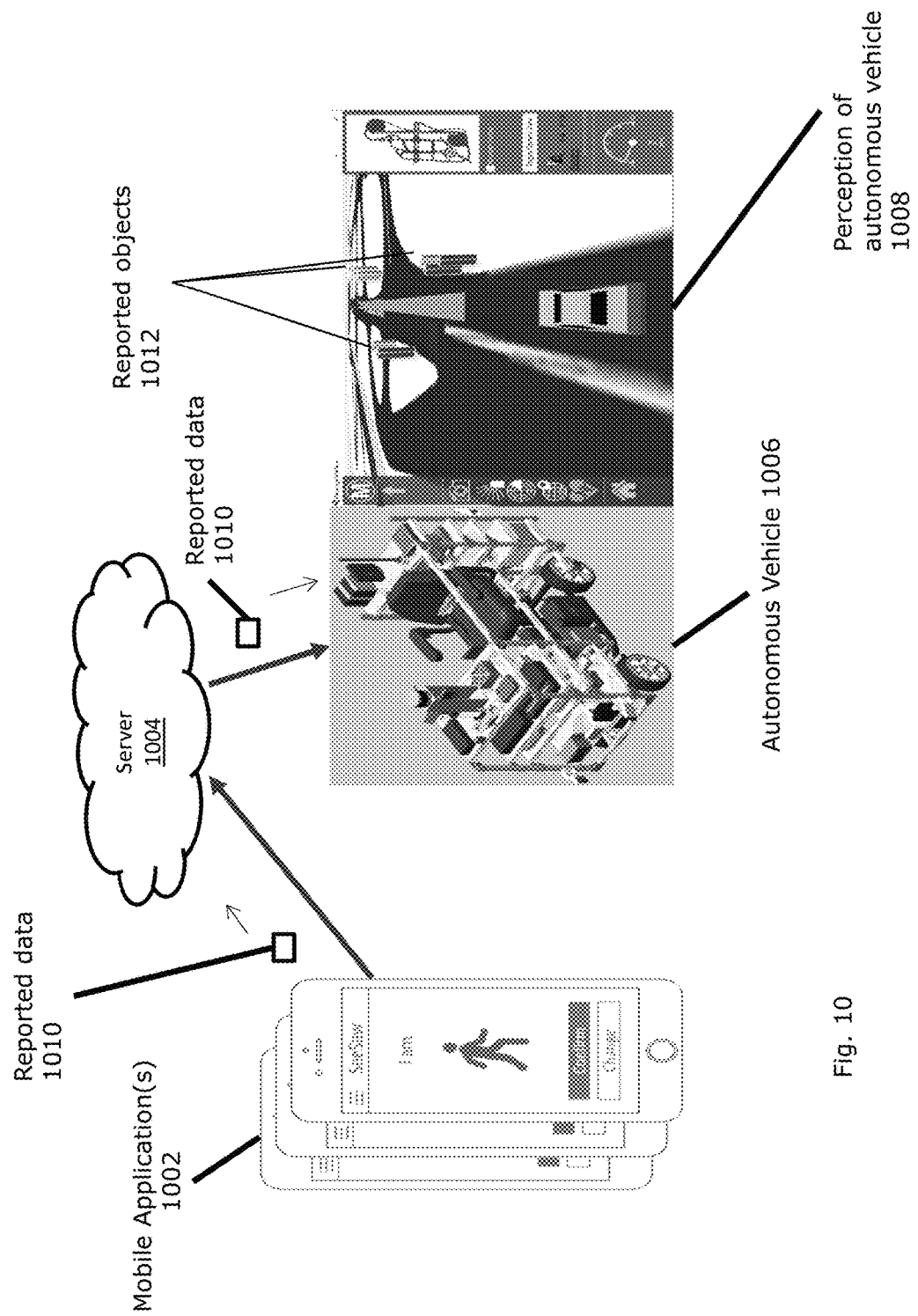
FIG. 10 is a network diagram illustrating a mobile application communicating with a server and a representation of an autonomous vehicle.

FIG. 10 is a network diagram 1000 illustrating a mobile application 1002 communicating with a server 1004 and a representation of an autonomous vehicle 1006. Upon receiving reported data 1010, the autonomous vehicle models the location of the reported objects 1012 within a perception of an autonomous vehicle. The columns shown within the perception 1008 model indicate reported objects, and thus, the car can avoid them.

Figure 11:
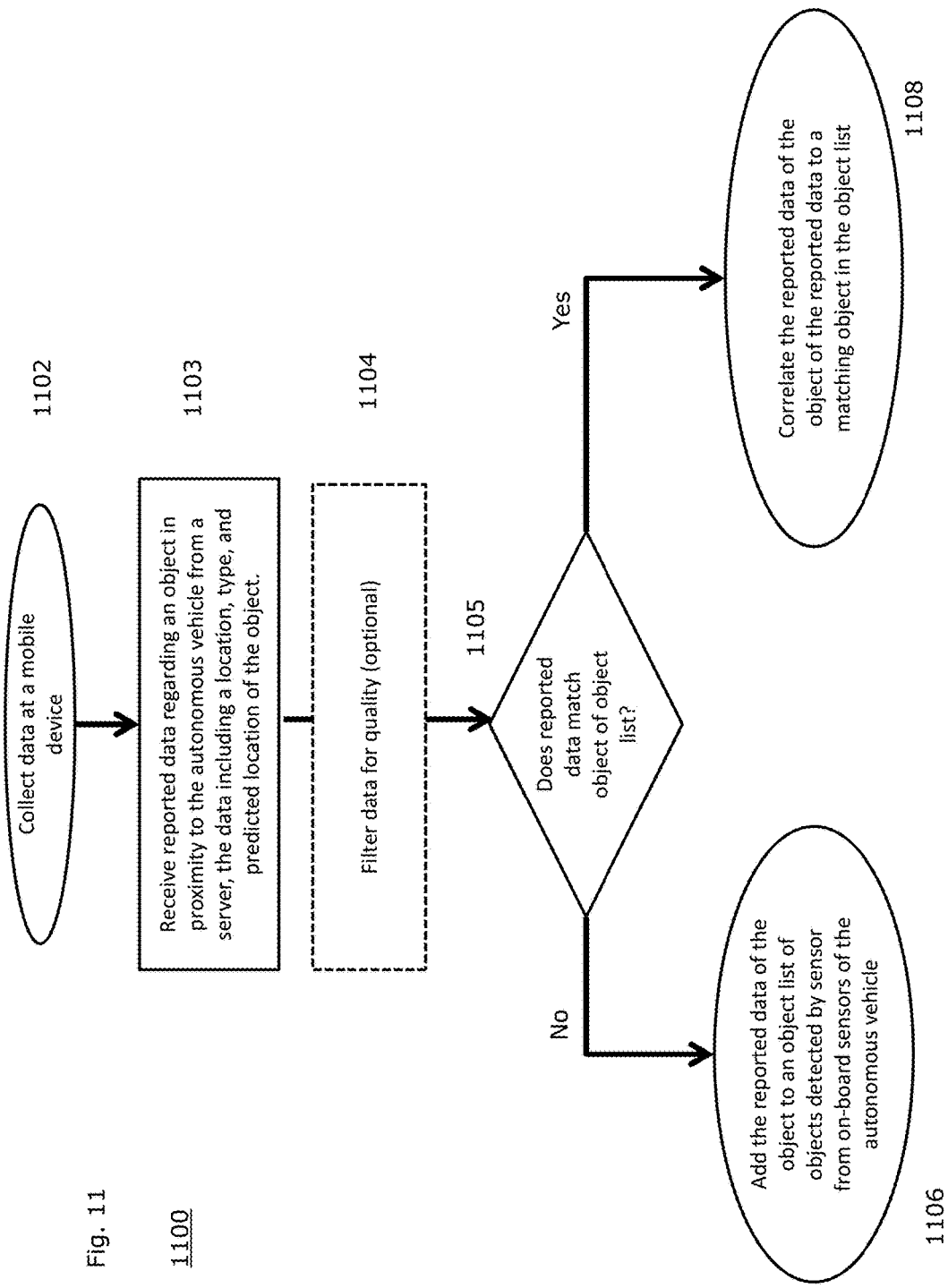
FIG. 11 is a flow diagram illustrating a process employed by an example embodiment of the present disclosure.

FIG. 11 is a flow diagram 1100 illustrating a process employed by an example embodiment of the present disclosure. After collecting data at a mobile device (1102), the process receives, at an autonomous vehicle, reported data regarding an object in proximity to the autonomous vehicle (1103). The data can then optionally be filtered for quality, such as filtering for signs of inaccurate location reporting due to building structures or bad WiFi, or other quality metrics (1104). The data is relayed to the autonomous vehicle via a server. The reported data including a current location of the object, a type of the object, or a predicted location of the object. Then, the process determines whether the reported data of the object matches an object in an object list (1105).

If the determination finds a matching object in the object list, the process correlates the reported data of the object to a matching object in the object list (1108). Otherwise, the process adds the reported data of the object to an object list of objects detected by sensor from on-board sensors of the autonomous vehicle (1106).

Figure 12:
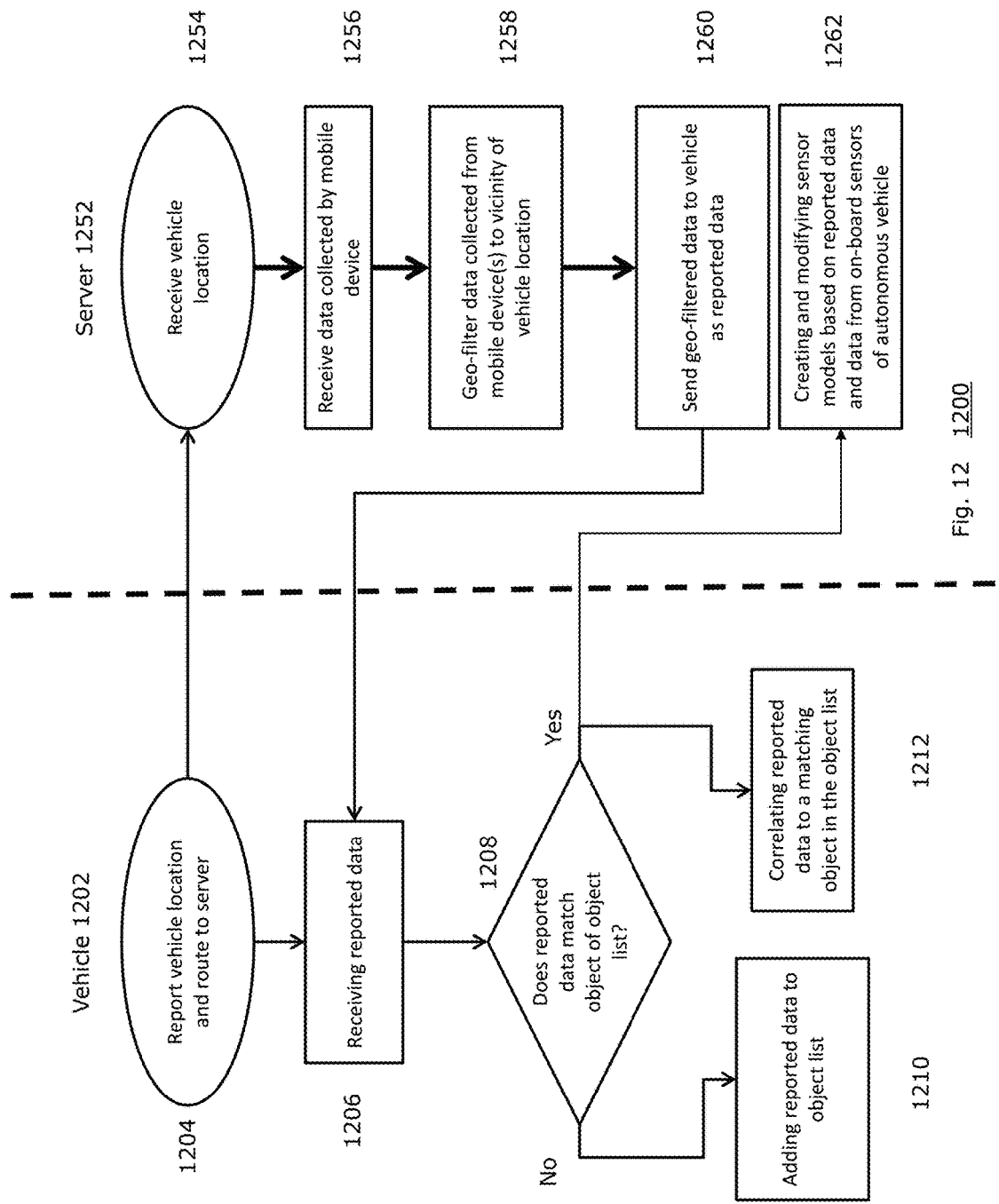
FIG. 12 is a flow diagram illustrating a process employed by an example embodiment of the present disclosure at a vehicle and server.

FIG. 12 is a flow diagram 1200 illustrating a process employed by an example embodiment of the present disclosure at a vehicle 1202 and server 1252. First the vehicle 1202 reports a vehicle location and vehicle route to the server 1252 (1204). In turn, the server receives the vehicle location (1254). The server 1252 then receives data collected by mobile device(s) (1256). The server then geo-filters data collected from the mobile device(s) to the vicinity of the vehicle location (1258). The server 1252 then sends the geo-filtered data to the vehicle as reported data to the vehicle 1202 (1260).

The vehicle 1202 receives the reported data (1206), then determines whether the reported data matches an object of an object list (1208). If so, the vehicle 1202 correlates the reported data to a matching object in the object list (1212). Separately, the server can also receive create and modify sensor models based on reported data and data from on-board sensors of autonomous vehicle (1262). The updated sensor model can then be sent back to the vehicle, as shown above in FIG. 6C. If the reported data does not match an object of the object list (1208), however, the vehicle 1202 adds reported data to the object list (1210).

While vehicles are the primary recipient of data, the collected data can further be used to improve vehicle sensor models. Reported data can further include pictures taken from the device, and the vehicle can analyze the pictures to identify objects that may not be visible to the vehicle. For example, mobile devices or stationary roadside cameras can report image collected data to vehicles. The image collected data can reflect objects that are at locations other than that of the collecting device. The image processing of the images can be performed at the collecting devices (e.g., mobile device, stationary roadside cameras) to save bandwidth and get the reported data to the vehicles faster. In other embodiments, however, the image analysis can be performed in the vehicle or on at a cloud server.

However, in addition to the immediate vehicle benefit, learning systems such as Amazon® Mechanical Turk can use the collected data to train automated systems in a better manner. Users of Mechanical Turk can verify or correct cars, pedestrians, cyclists, and other objects detected in traditional image systems, such that the model can be improved in the future.

The model can also be improved by automatically identifying differences between the "ground truth" reported by mobile devices and the vehicle's analysis of the sensors. Differences between the vehicle's original analysis and the mobile collected data can be automatically identified. Then, a machine learning process can associate the "ground truth"

reported by these mobile devices to similar data sensed by the vehicle's other sensors, thereby improving the vehicle's future performance.

In one embodiment, image analysis can be performed on the vehicle, but in other embodiments the image analysis can be performed on the server or on the mobile device.

Figure 13:
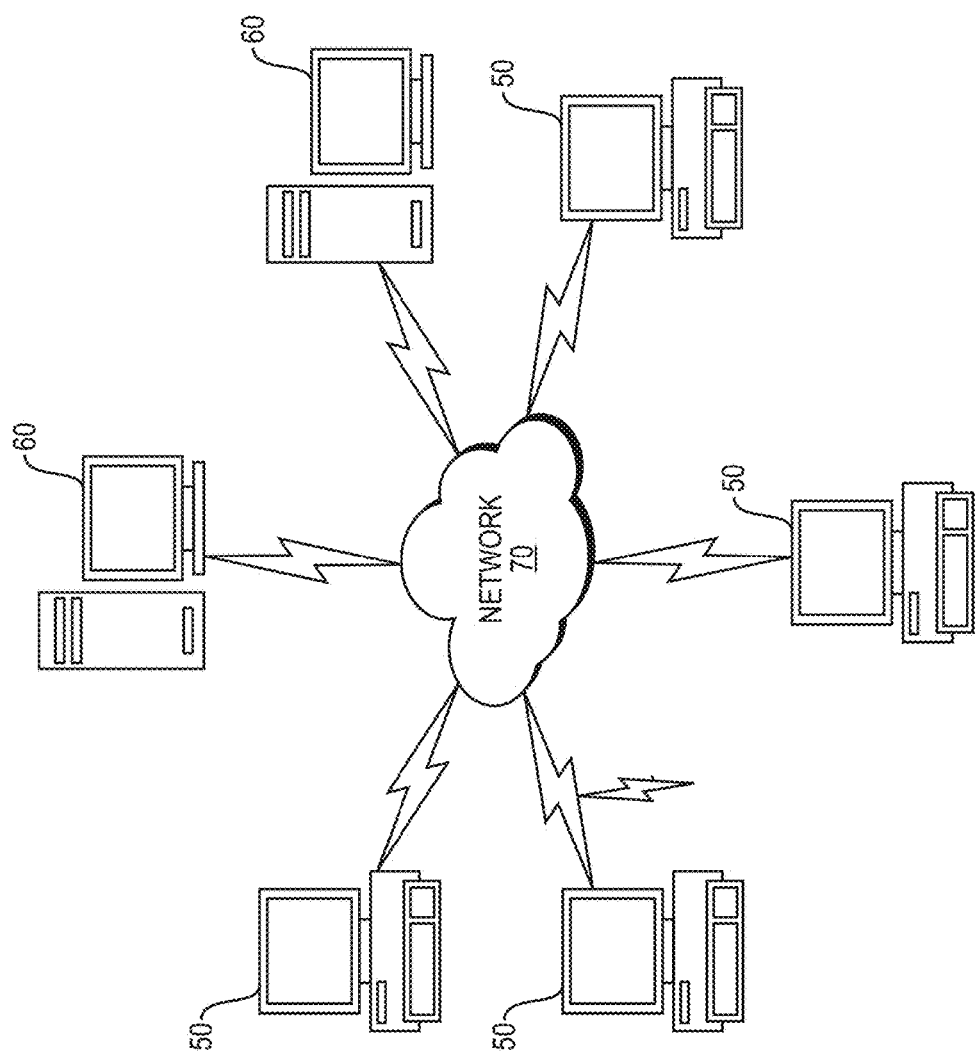
FIG. 13 illustrates a computer network or similar digital processing environment in which embodiments of the present disclosure may be implemented.

FIG. 13 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 14:
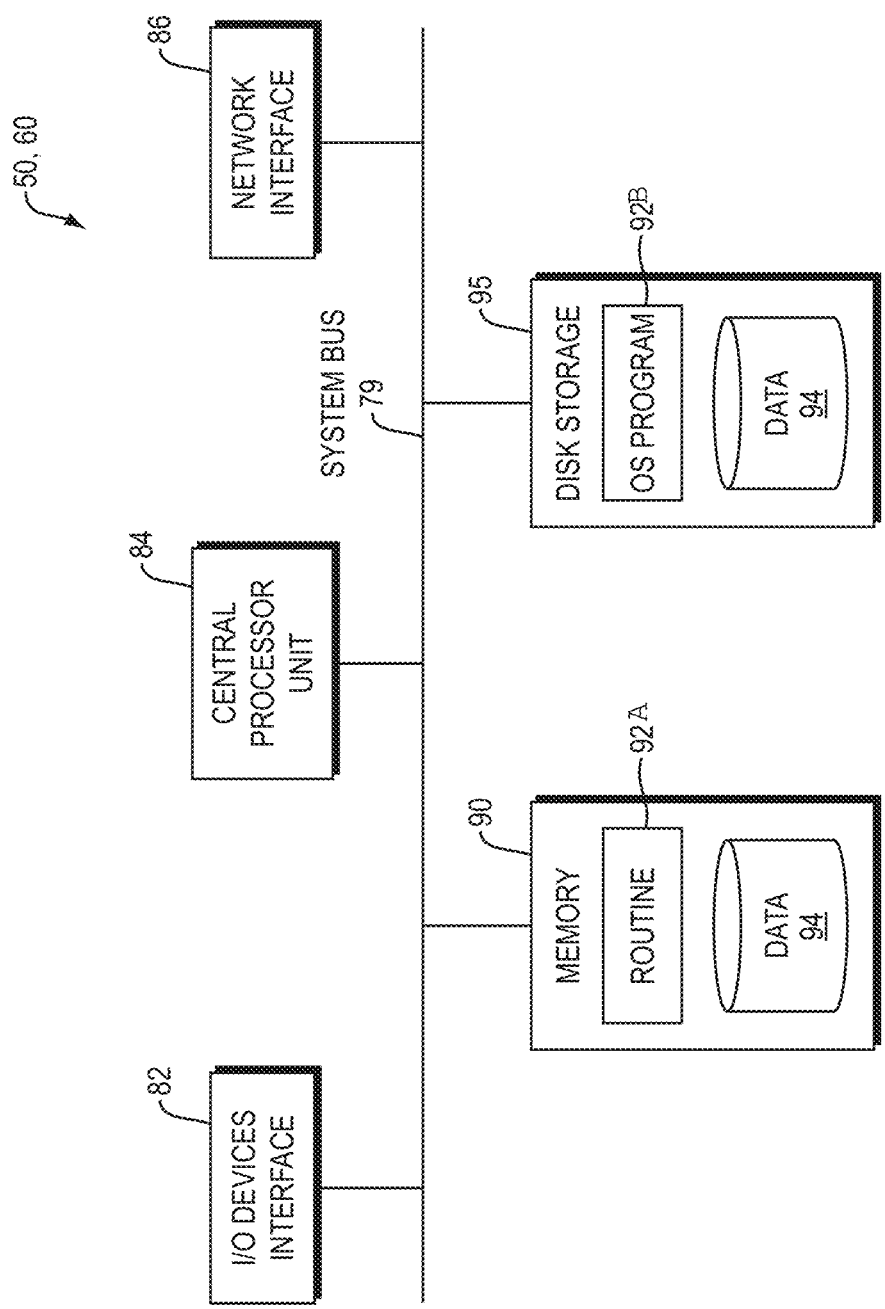
FIG. 14 is a diagram of an example internal structure of a computer (e.g., client processor/device or server computers) in the computer system of FIG. 13.

FIG. 14 is a diagram of an example internal structure of a computer (e.g., client processor/device 50 or server computers 60) in the computer system of FIG. 13. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 13). Memory 90 provides volatile storage for computer software instructions 92 and data 94 used to implement an embodiment of the present disclosure (e.g., sensor interface controller, perception controller, localization controller, automated driving controller, vehicle controller, system controller, human interaction controller, and machine interaction controller detailed above). Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the disclosure system. The computer program product 92 can be installed by any suitable software installation procedure, as is well known in the art. In another embodiment, at least a portion of the software instructions may also be downloaded over a cable communication and/or wireless connection. In other embodiments, the disclosure programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
receiving, at an autonomous vehicle, reported data regarding an object in proximity to the autonomous vehicle, the data collected by a collecting device external to the autonomous vehicle and relayed to the autonomous vehicle via a server, the reported data including at least one of a current location of the object, a type of the object, and a predicted location of the object;
determining, at the autonomous vehicle, whether the reported data of the object correlates with a found object in an object list;
if the determination finds the found object in the object list, adding the reported data of the object to data associated with the found object in the object list; and
otherwise, adding the reported data of the object to an object list of objects detected by sensor from on-board sensors of the autonomous vehicle.

2. The method of claim 1, wherein the type of the object is a pedestrian, bicycle, vehicle, or vehicle type.

3. The method of claim 1, wherein the reported data includes location data collected from the collecting device of the object, further wherein the location data provides the current location of the object, and further comprising:
predicting a future location of the object based on a history of the location data.

4. The method of claim 1, wherein the type of the object is determined based on a vibration pattern of the collecting device, wherein the collecting device is a mobile device.

5. The method of claim 1, wherein the type of object is determined by a user of the collecting device self-identifying the type of object.

6. The method of claim 1, wherein the reported data further includes at least one of velocity and acceleration data of the object, a route map of the object, and a calendar of a user of the object.

7. The method of claim 6, wherein the predicted location of the object is determined by loading the route map of the object, or by loading a destination location from the calendar of the user and generating a route map from the current location to the destination location.

8. The method of claim 1, further comprising building a sensor model based on the reported data from the collection device and data from the on-board sensors of the autonomous vehicle.

9. The method of claim 1, further comprising modifying a sensor model based on discrepancies between the reported data from the collection device and data from the on-board sensors of the autonomous vehicle.

10. The method of claim 1, further comprising generating the reported data of the object by analyzing at least one image taken by the collecting device.

11. The method of claim 1, further comprising identifying the reported data as an emergency vehicle signal.

12. The method of claim 1, further comprising:
reporting, from the autonomous vehicle to the server, at least one of a location and direction of the vehicle, such that the data returned from the server is related to a current and future locations of the autonomous vehicle.

13. The method of claim 12, wherein the data returned from the server is selected from a list of object data reported from multiple collecting devices stored at the server.

14. The method of claim 1, wherein at least one of the objects of the object list is determined by on-board sensors of the autonomous vehicle.

15. The method of claim 1, wherein the predicted location is calculated based on a propagation delay of the reported data.

16. A system comprising:
a processor; and
a memory with computer code instructions stored therein, the memory operatively coupled to said processor such that the computer code instructions configure the processor to implement:
a machine interaction controller configured to receive, at an autonomous vehicle, reported data regarding an object in proximity to the autonomous vehicle, the data collected by a collecting device external to the autonomous vehicle and relayed to the autonomous vehicle via a server, the reported data including at least one of a current location of the object, a type of the object, and a predicted location of the object; and
a perception controller configured to:
  determine, at the autonomous vehicle, whether the reported data of the object correlates with a found object in an object list, wherein at least one of the objects of the object list is determined by on-board sensors of the autonomous vehicle;
  if the determination finds the found object in the object list, add the reported data of the object to data associated with the found object in the object list, and
  otherwise, add the reported data of the object to an object list of objects detected by sensor from on-board sensors of the autonomous vehicle.

17. The system of claim 16, wherein the type of the object is a pedestrian, bicycle, vehicle, or vehicle type.

18. The system of claim 16, wherein the reported data includes location data collected from the collecting device of the object, further wherein the location data provides the current location of the object, and further wherein the perception controller is configured to predict a future location of the object based on a history of the location data.

19. The system of claim 16, wherein the type of the object is determined based on a vibration pattern of the mobile device.

20. The system of claim 16, wherein the type of object is determined by a user of the collecting device self-identifying the type of object, wherein the collecting device is a mobile device.

21. The system of claim 16, wherein the reported data further includes at least one of acceleration data of the object, a route map of the object, and a calendar of a user of the object.

22. The system of claim 21, wherein the predicted location of the object is determined by loading the route map of the object, or by loading a destination location from the calendar of the user and generating a route map from the current location to the destination location.

23. The system of claim 16, wherein the processor is further configured to implement:
a model modification module configured to build a sensor model based on the reported data from the collection device and data from the on-board sensors of the autonomous vehicle.

24. The system of claim 16, wherein the processor is further configured to implement:
a model modification module configured to modifying a sensor model based on discrepancies between the reported data from the collection device and data from the on-board sensors of the autonomous vehicle.

25. The system of claim 16, wherein the reported data of the object is generated by analyzing at least one image taken by the collecting device.

26. The system of claim 16, wherein the perception controller is further configured to identifying the reported data as an emergency vehicle signal.

27. The system of claim 16, wherein the machine interaction controller is further configured to report, from the autonomous vehicle to the server, at least one of a location and direction of the vehicle, such that the data returned from the server is related to a current and future locations of the autonomous vehicle.

28. The system of claim 16, further comprising, wherein the data returned from the server is selected from a list of object data reported from multiple collecting devices stored at the server.

29. The system of claim 16, wherein at least one of the objects of the object list is determined by on-board sensors of the autonomous vehicle.

30. The system of claim 16, wherein the predicted location is calculated based on a propagation delay of the reported data.

31. A non-transitory computer-readable medium configured to store instructions for providing data to an autonomous vehicle, the instructions, when loaded and executed by a processor, causes the processor to:
receive, at an autonomous vehicle, reported data regarding an object in proximity to the autonomous vehicle, the data collected by a collecting device external to the autonomous vehicle and relayed to the autonomous vehicle via a server, the reported data including at least one of a current location of the object, a type of the object, and a predicted location of the object;
determine, at the autonomous vehicle, whether the reported data of the object correlates with a found object in an object list;
if the determination finds the found object in the object list, add the reported data of the object to data associated with the found object in the object list; and
otherwise, add the reported data of the object to an object list of objects detected by sensor from on-board sensors of the autonomous vehicle.

* * * * *